(12) United States Patent
Shooter et al.

(10) Patent No.: US 10,308,836 B2
(45) Date of Patent: Jun. 4, 2019

(54) DISPERSANTS WITH MULTIPLE AROMATIC IMIDE ANCHOR GROUPS

(71) Applicant: Lubrizol Advanced Materials, Inc., Cleveland, OH (US)

(72) Inventors: Andrew J. Shooter, Wilmslow (GB); Dean Thetford, Norden (GB); Robert A. Jennings, Salford (GB); Stuart N. Richards, Frodsham (GB)

( * ) Notice: Subject to any disclaimer, the term of this patent is extended or adjusted under 35 U.S.C. 154(b) by 0 days.

(21) Appl. No.: 15/032,792

(22) PCT Filed: Oct. 24, 2014

(86) PCT No.: PCT/US2014/062132
§ 371 (c)(1),
(2) Date: Apr. 28, 2016

(87) PCT Pub. No.: WO2015/065831
PCT Pub. Date: May 7, 2015

(65) Prior Publication Data
US 2016/0251523 A1    Sep. 1, 2016

Related U.S. Application Data

(60) Provisional application No. 61/898,670, filed on Nov. 1, 2013.

(51) Int. Cl.
| | | |
|---|---|---|
| *C09D 179/00* | (2006.01) | |
| *C09D 179/08* | (2006.01) | |
| *C08G 18/64* | (2006.01) | |
| *C08G 18/38* | (2006.01) | |
| *C08G 18/50* | (2006.01) | |
| *C08G 18/75* | (2006.01) | |
| *C08G 18/76* | (2006.01) | |
| *C08G 18/28* | (2006.01) | |
| *C08G 18/32* | (2006.01) | |
| *C09D 11/037* | (2014.01) | |
| *C09D 11/102* | (2014.01) | |
| *C09D 11/322* | (2014.01) | |
| *C09D 7/45* | (2018.01) | |

(52) U.S. Cl.
CPC ......... *C09D 179/08* (2013.01); *C08G 18/284* (2013.01); *C08G 18/285* (2013.01); *C08G 18/3206* (2013.01); *C08G 18/3215* (2013.01); *C08G 18/3275* (2013.01); *C08G 18/3846* (2013.01); *C08G 18/5021* (2013.01); *C08G 18/6438* (2013.01); *C08G 18/755* (2013.01); *C08G 18/7621* (2013.01); *C08G 18/7657* (2013.01); *C09D 7/45* (2018.01); *C09D 11/037* (2013.01); *C09D 11/102* (2013.01); *C09D 11/322* (2013.01)

(58) Field of Classification Search
CPC .............. C08G 18/3846; C08G 18/285; C08G 18/6438; C08G 18/284; C09D 11/102; C09D 11/322; C09D 11/037; C09D 179/08

See application file for complete search history.

(56) References Cited

U.S. PATENT DOCUMENTS

| | | | |
|---|---|---|---|
| 3,510,453 A * | 5/1970 | Geiser ................. | C08G 18/678 521/159 |
| 4,585,806 A * | 4/1986 | Barda ................ | C08G 18/3846 252/609 |
| 5,688,312 A | 11/1997 | Sacripante et al. | |
| 6,037,414 A | 3/2000 | Simms et al. | |
| 6,440,207 B1 | 8/2002 | Schulz et al. | |
| 7,265,197 B2 | 9/2007 | Huber et al. | |
| 2008/0227945 A1 | 9/2008 | Richards et al. | |
| 2010/0132989 A1* | 6/2010 | Fujihara ................ | C08G 18/10 174/258 |
| 2010/0240825 A1 | 9/2010 | Shimohara et al. | |
| 2011/0294929 A1* | 12/2011 | Cristadoro ........... | C08G 18/346 524/94 |

FOREIGN PATENT DOCUMENTS

| | | |
|---|---|---|
| JP | 2013053200 A | 3/2013 |
| WO | 2007139980 A1 | 12/2007 |
| WO | 2008028954 A1 | 3/2008 |
| WO | 2013165770 A1 | 11/2013 |
| WO | 2013165792 A1 | 11/2013 |

* cited by examiner

*Primary Examiner* — Michael L Leonard
(74) *Attorney, Agent, or Firm* — Samuel Laferty; Teresan Gilbert

(57) ABSTRACT

Polymeric dispersants are disclosed that include a urethane backbone at least one pendantly attached imide group, wherein the carbonyl of the imide are chemically bonded to a single or fused aromatic ring. The aromatic ring can be substituted with various electron withdrawing or releasing groups. The dispersant also includes solvent-solubilizing chains of polyether, polyester, polyacrylate, and or polyolefin Desirably, the imide groups are derived from an imide that has two isocyanate reactive groups such that the imide is attached to the urethane backbone at two separate locations.

20 Claims, No Drawings

DISPERSANTS WITH MULTIPLE AROMATIC IMIDE ANCHOR GROUPS

CROSS REFERENCE TO RELATED APPLICATION

This application claims priority from PCT Application Serial No. PCT/US2014/062132 filed on Oct. 24, 2014, which claims the benefit of U.S. Provisional Application No. 61/898,670 filed on Nov. 1, 2013.

FIELD OF INVENTION

The present invention relates to a dispersant with at least one imide group pendant from an aromatic ring or fused aromatic ring attached to each dispersant molecule. The imide groups pendant from aromatic or fused aromatic rings give particularly good anchoring effect and having multiple such groups per dispersant molecule is desirable. Compositions using said dispersant in combination with an aqueous, polar or non-polar organic medium and a particulate solid are also disclosed and claimed.

BACKGROUND OF THE INVENTION

Many formulations such as inks, paints, millbases and plastics materials require effective dispersants for uniformly distributing a particulate solid in a polar organic medium or a non-polar organic medium. For inks, it is desirable for ink manufacturers to generate printed products of high resolution and quality. The adaptability of printing process to cater for the ever widening range of base substrates, resins and pigments is a challenge. The pigment dispersion should be compatible with the different formulations used to ensure good adhesion and resistance of the final coating. Poor pigment dispersion or stabilisation can result in agglomeration or settling within the polar organic liquid medium or a non-polar organic liquid medium (e.g., ink or coating) lowering the gloss and aesthetic appeal.

U.S. Pat. No. 7,265,197 discloses dispersing pigments in ink compositions with a dispersant having formula:

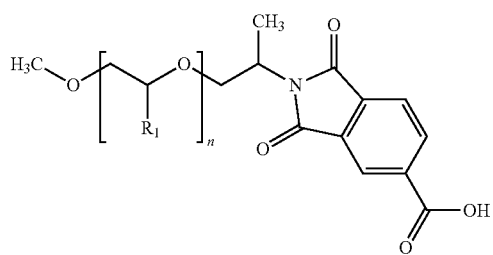

where $R_1$ is individually selected from the group consisting of H and $CH_3$, and n is an integer from 4 to 400).

International publication WO 2008/028954 discloses imide dispersant compounds containing terminal acidic groups in both a polar and a non-polar organic medium, where the dispersant compound is represented by the structure

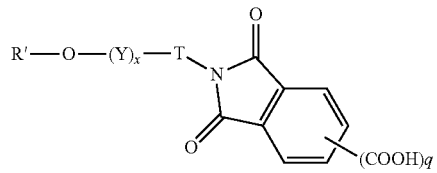

where T is $-(CH_2)_3-$ or $-CH_2CH(CH_3)-$; R' is H or $C_{1-50}$-optionally substituted hydrocarbyl group, or $C_{1-50}$-optionally substituted hydrocarbonyl; Y is $C_{2-4}$-alkyleneoxy; x is 2 to 90; and q is 1 or 2, with the proviso that in Formula (1a), when q is 1, T is $-(CH_2)_3-$, and when q is 2, T is $-(CH_2)_3-$ or $-CH_2CH(CH_3)-$.

U.S. Pat. No. 5,688,312 discloses an ink composition comprised of a colourant and an imide or bisimide with a viscosity of from about 1 centipoise to about 10 centipoise at a temperature of from about 125 to about 180° C. The imide or bisimide may be prepared by reacting phthalic anhydride and a mono- or diamine. The monoamine may be for example dodecylamine, or stearylamine. The diamine may be 1,12-dodecanediamine.

International Patent Application WO 2007/139980 discloses a reaction product of at least one di-anhydride with at least two reactants which are different from each other, each of which reactants contains a primary or secondary amino, hydroxyl or thiol functional group, and at least one of which reactants is polymeric. The reaction product is useful in compositions such as inks and coatings.

U.S. Pat. No. 6,440,207 discloses a process for preparing dispersible dry organic pigments for aqueous systems by (a) milling a mixture containing (1) one or more organic pigments, (2) at least about 1% by weight, relative to the organic pigment, of one or more aromatic polyalkylene oxide dispersants, (3) 0 to about 10 parts by weight, relative to the organic pigment, of a milling liquid in which the organic pigment is substantially insoluble, (4) 0 to about 50% by weight, relative to the organic pigment, of one or more milling additives other than dispersant (2), and (5) 0 to about 20% by weight, relative to the organic pigment, of one or more surface treatment additives; (b) optionally, adding to the milled pigment (6) one or more liquids in which the organic pigment is substantially insoluble in amounts such that the total solids content is not reduced below about 10%, and (7) one or more multivalent metal salts and/or one or more quaternary ammonium salt; and (c) isolating the milled organic pigment. The aromatic polyalkylene oxide dispersant may be prepared by reacting in an autoclave containing 250 g of deionized water 19.8 (0.100 mol) of 1,8-naphthalic anhydride and 105 (0.105 mol) of Surfonamine™ XTJ-506 (83 wt % ethylene oxide, 17 wt % propylene oxide). The autoclave was sealed, heated with stirring to 150° C., and maintained at 150° C. for five hours. After the reaction had cooled, the resultant brown liquid was discharged into a beaker to which was then added 15 g of decolourizing charcoal. After stirring overnight, the suspension was filtered and the filter cake washed with water, yielding approximately 500 g of an amber-coloured filtrate having a 23.63% solids content. The dry pigment can be employed in water-based paint systems.

International Patent application PCT/US13/038114, filed 25 Apr. 2013, entitled "Aromatic Dispersant Composition" (by Shooter, Thetford and Richards) discloses a polymer comprising a polymer chain having at least one nonfused aromatic imide pendant group, wherein the polymer is represented by formula:

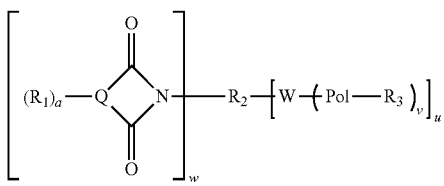

wherein Pol is a homopolymer chain or a copolymer chain, wherein the polymer chain is selected from the group consisting essentially of a poly(ether), poly(ester), poly (ester amide), poly(amide), poly(alkylene), and mixtures thereof, Q is a nonfused aromatic ring containing 4n+2 π-electrons, wherein n=2 or more, and Q is bonded to the imide group in such a way to form a 5 or 6 membered imide ring. Further disclosed is a millbase, paint or ink composition comprising a particulate solid, a non-polar organic medium, and the polymer disclosed therein.

International Patent application PCT/US13/037928, filed 24 Apr. 2013, entitled "Aromatic Dispersant Composition" (by Shooter, Thetford and Richards) discloses a polymer comprising a polymer chain having at least one fused aromatic imide pendant group, wherein the polymer is represented by formula:

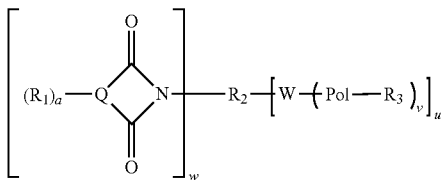

wherein Pol may be a homopolymer chain of ethylene oxide or a copolymer chain of ethylene oxide, wherein the ethylene oxide constitutes 40 wt % to 99.99 wt % of the copolymer chain; and Q may be a non-fused aromatic ring containing 4n+2 π-electrons, and Q is bonded to the imide group in such a way to form a 5 or 6 membered imide ring. Also disclosed is a millbase, paint or ink composition comprising a particulate solid (typically a pigment or filler), an aqueous medium, and the polymer chain disclosed therein.

SUMMARY OF THE INVENTION

The disclosed technology provides for at least one imide group attached to a urethane dispersant molecule to provide enhanced anchoring to various particulate material which is dispersed in water, a polar organic or nonpolar organic medium. The carbonyls of the imide groups are chemically bonded directly to carbon atoms of a single or fused aromatic ring represented by Q.

DETAILED DESCRIPTION OF THE INVENTION

Various preferred features and embodiments will be described below by way of non-limiting illustration.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above. The use of (meth) in a monomer or repeat unit indicates an optional methyl group.

One objective of the present invention is to provide compounds that are capable of improving the colour strength or other tinctorial properties, increasing a particulate solid load, and/or forming improved dispersions, having improved brightness of the final composition while also producing a composition with reduced viscosity good dispersion stability, reduced particle size and reduced particle size distribution (typically reduced to an average of 150 nm or less, for example in the range of 70-135 nm), reduced haze, improved gloss, and increased jetness (especially when the composition is black). The composition of the present invention may also be stable under ambient storage, and high temperature storage conditions. The composition of the present invention may also be stable under ambient storage, and high temperature storage conditions, providing reduced discolouration or yellowing of the final coating.

A polymer comprising a polymer chain having at least one and in another embodiment at least two, three or four pendant imide side chain groups, wherein each imide group is chemically bonded to an aromatic ring (either a single aromatic ring or a fused aromatic ring) the polymer is represented by Formula (1):

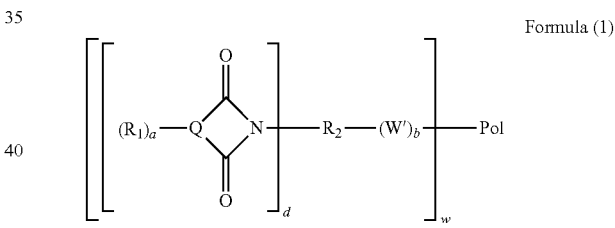

Formula (1)

wherein each variable is independently each time it occurs as follow:

$R_1$ may be a substituent on Q ring in any position available for bonding to a substituent group and $R_1$ may be independently represented by one or more of H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group of 1 to 3 carbon atoms e.g., —$CH_3$), (typically when $R_1$ may be other than H; the number of non-H substituted groups on Q is defined by a which may be 0 to 2, 0 to 1, 0, or 1), more preferably $R_1$ may be —H and optionally —Cl, —Br, —$SO_3M$ or —$NO_2$; wherein M can be H, a metal cation, $NR'_4{}^+$, or mixtures thereof; each R' can independently be —H, an optionally-substituted alkyl typically containing 1 to 20, or 1 to 10 carbon atoms, and the substituent of R' may be hydroxyl or halo (typically Cl or Br) or mixtures thereof; desirably the substituent(s) $R_1$ on the aromatic ring (Q) portion of the aromatic imide do not form a second heterocyclic ring and in particular neither form a second imide nor anhydride of a dicarboxylic acid;

Q may be a fused or non-fused aromatic ring containing 4n+2 π-electrons, wherein n=1 or more, (more desirably 1 to 3, or 1 to 2, or 1, or 2), and Q may be bonded to the imide group in such a way to form a 5 or 6 membered imide ring (typically 5 membered);

b is 1 or 2 and when b is 1 the imide group is terminal and attached to the Pol by one chemical bond and when b is 2 the imide group is a side chain attached to Pol by two chemical bonds;

d is 1, 2, or 3; more preferably 1 or 2, and most preferably 1; this means that there is the possibility of 1 to 3 imide groups attached to $R_2$ at different carbon atoms of $R_2$ $R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched) or mixtures thereof; $R_2$ may include oxygen and/or nitrogen atoms wherein there is at least 2 carbon atoms per every oxygen or nitrogen of $R_2$, these would include ether, ester, and amide type linkages in $R_2$ W' is a nitrogen atom, an oxygen atom or a direct bond; W' is a residue of the reaction of an amino, hydroxyl or carboxyl group, preferably amino or hydroxyl of the imide containing group with an isocyanate in a conventional reaction forming a chemical bond between an amino, hydroxy, or carboxyl group with an isocyanate; when b is 2 then one of the W' can be derived from a secondary amine reacted with said isocyanate and be in the $R_2$ linking group between the imide and the other W' group, when b is 2 each W' group can be the same or different;

w is one (1) or more, more desirably 1, 2, 3, or 4, to 30, more desirably 1, 2, 3, or 4 to 25, and preferably 1, 2, 3, or 4 to 10 or 20;

Pol is a polyurethane comprising a total of at least two urethane and/or urea linkages and at least one solvent-solubilizing chain selected from the group of polyether, polyolefin, polyester and polyacrylate pendant terminal and/or lateral side chains, or mixtures of said terminal and/or side chains. While the formula might be interpreted to indicate a single bond between Pol and W', the bond(s) between Pol and each W' allows for one or more terminal and/or pendant side chain imide groups (as defined by w) to be attached to Pol at one or more locations on Pol and for each imide group to be attached to Pol by one or more bond (as defined by b).

The invention herein is useful as a urethane dispersant for a particulate matter in a continuous medium such as water, a polar organic or nonpolar organic liquid media, which may be better understood with reference to the following examples. In embodiment 2 the urethane dispersant can be visualized as a comb polymer with interspersed pendant (laterally attached), wherein some pendant (laterally attached) groups comprise imide functional groups and some of said pendant groups comprise solvent-solubilising chains.

In embodiments 2 and 3, the reactant utilized to incorporate the imide group into the dispersant typically has two isocyanate reactive groups (groups reactive with isocyanate) at one end of the reactant (within 2 to 17 backbone atoms of each other) that allow one end of the imide containing compound to be reacted into a polyurethane backbone while the portion of the compound containing the imide group is pendant from the backbone (rather than bound into the polymer backbone). In embodiments 2 and 3, the polyisocyanate is desirably predominantly derived from a diisocyanate such that it forms a linear polyurethane backbone rather than a branched polyurethane backbone (as one would get from a trifunctional or higher functionality polyisocyanate).

In both embodiments 2 and 3, the low molecular weight urethane formative compound having two functional groups or one functional group, functional group meaning a group reactive with isocyanate, typically has less than 2000 or 3000 or desirably less than 500 g/mole molecular weight. Again, the functionality of the formative compound is so limited to 2 or less so the polyurethane backbone remains essentially linear rather than highly branched. In embodiment 2, there can also be reacted chain terminating compounds that have only one functional group, reactive with isocyanate groups, that can be utilized to limit the molecular weight of the dispersant.

In a preferred embodiment where we express a desirable essentially linear polyurethane backbone the reactants forming the urethane polymer and urethane dispersant (polyisocyanate (preferably diisocyanate), imide reactant, formative compounds, and terminating compounds) have an average function of about 2 or less and greater than 90, 95, or 99 mole % of said reactants are difunctional or less and less than 10, 5, or 1 mole % of said reactants have a functionality above 2.

In embodiment 2, the solvent-solubilising chains are characterized by having about 2 groups (reactive with isocyanates) at one end of the chain such that only a small portion (about 2 to 17 backbone atoms) of the solvent-solubilising chain is incorporated into the polyurethane backbone and the rest of the solvent-solubilising chain is laterally or pendantly attached to the polyurethane backbone. This creates the comb type molecular architecture with the imide groups being teeth of the comb.

According to the present invention there is provided a composition comprising a particulate solid, an organic or aqueous medium and a polyurethane dispersant having an essentially linear polyurethane backbone with at least one pendant imide group laterally attached at one point only to the polyurethane backbone and solvent-solubilising chains of polyester, polyether, polyolefin or polyacrylate chemically bonded to said polyurethane backbone. In an additional desired embodiment at least 2, 3, or 4 or more imide groups are pendant laterally from said essentially linear polyurethane backbone.

The pendant side chain or terminal imide is represented in Formula 2.

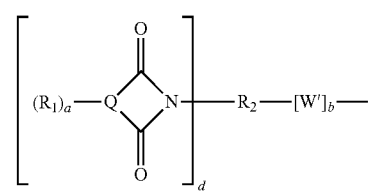

Formula 2

$R_1$ may be a substituent on Q ring in any position available for bonding to a substituent group and $R_1$ may be independently represented by one or more of —H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group e.g., —$CH_3$), (typically when $R_1$ may be other than —H, the number of non —H groups defined by a may be 0 to 2, 0 to 1, 0, or 1). For example, $R_1$ may be —H, —$CH_3$, —Cl, or —Br, —$NO_2$, —$SO_3M$, or —CN (typically when a may be non-zero $R_1$ may be —Cl, —Br, —$SO_3M$ or —$NO_2$); M may be H, a metal cation, —$NR'_4^+$, or mixtures thereof; R' may be —H, an optionally-substituted alkyl typically containing 1 to 20, or 1 to 10 carbon atoms, and the substituent may be hydroxyl or halo (typically Cl or Br) or mixtures thereof;

b is 1 or 2 and when b is 1 the imide group is terminal and attached to the Pol by one chemical bond and when b is 2 the imide group is a pendant side chain attached to Pol by two chemical bonds;

d is 1, 2, or 3; more preferably 1 or 2, and most preferably 1; this means that there is the possibility of 1 to 3 imide groups attached to $R_2$ at different carbon atoms of $R_2$;

Q may be a fused or non-fused aromatic ring containing $4n+2$ π-electrons, wherein n=1 or more, (typically 1 to 3, or 1 to 2, or 1), and Q may be bonded to the imide group in such a way to form a 5 or 6 membered imide ring (typically 5 membered). In a preferred embodiment Q is a fused aromatic ring. Examples of Q with fused aromatic rings include 1,2 naphthalic anhydride, 1,8 naphthalic anhydride, 2,3-naphthalic anhydride, 4-nitro-1,8-naphthalic anhydride, 3-nitro-1,8-naphthalic anhydride, 4-chloro-1,8-naphthalic imide, 4-sulpho-1,8-naphthalic imide, 3-sulpho-1,8-naphthalic anhydride.

$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched) or mixtures thereof; $R_2$ may include oxygen and/or nitrogen atoms wherein there is at least 2 carbon atoms per every oxygen or nitrogen of $R_2$, these would include ether, ester, and amide type linkages in $R_2$;

Pol is a polyurethane comprising of polyether, polyester, polyolefin or polyacrylate solvent-solubilising chains or mixtures thereof; the imide containing group, and the urethane reaction product of polyisocyanates with hydroxyl groups.

Each W' is independently a nitrogen atom, an oxygen atom or a direct bond; W' is the residue of a functional group reacted with an isocyanate group to form a chemical bond, for example W' can be derived from amino, hydroxyl, carboxyl, and the two W' on an aromatic imide can be derived from a dihydroxyl, diamino, or hydroxyl-amine, when b is 2 then one or two of the W' can be derived from a secondary amine reacted with said isocyanate and be in the $R_2$ linking group between the imide and the other W' group, when b is 2 each W' group can be the same or different;

w is at least 1, desirable from 1, 2, 3, or 4 to 30, more desirably 1, 2, 3 or 4 to 25, or more desirably 1, 2, 3, or 4 to 10 or 20;

Desirably, the side chain imide of Formula 2 comprises from about 1, 2, or 3 to about 30 wt. % of the urethane dispersant, more desirably from about 1, 2, or 3 to about 20 or 25 wt. % and preferably from about 1, 2, or 3 to about 10 or 15 wt. %. The total weight percentage of the solvent-solubilising chains (e.g., polyether, polyester, polyolefin and/or polyacrylate) in the polyurethane dispersant in one embodiment is preferably not less than 5%, in another embodiment not less than 20%, more preferably not less than 30% and especially not less than 40% by weight of the polyurethane dispersant. It is also preferred that the total weight percentage of solvent-soluble chains in the polyurethane dispersant is not greater than 80%, more preferably not greater than 70%, especially not greater than 60% based on the weight of the dispersant. In one embodiment, the total weight percentage of solvent-soluble terminal chains in the polyurethane dispersant is not greater than 60%, for instance 40% to 60%.

The polyisocyanates in embodiments 2 and 3 desirably are one or more diisocyanates having an average functionality of from about 1.9 to 2.1, in another embodiment from about 2.0. Such polyisocyanates are well known to the art and include diisocyanate or mixtures of diisocyanates such as toluene diisocyanate (TDI), isophorone diisocyanate (IPDI), hexanediisocyanate (HDI), a, a-tetramethylxylene diisocyanate (TMXDI), diphenylmethane-4, 4-diisocyanate (4,4'-MDI), diphenylmethane-2, 4-diisocyanate (2, 4'-MDI) and dicyclohexylmethane-4, 4-diisocyanate (HMDI). Preferably, component (a) is either TDI or IPDI or MDI.

The number average molecular weight of the polyurethane dispersant is preferably not less than 2,000, more preferably not less than 3,000 and especially not less than 4,000. It is also preferred that the number average molecular weight of the polyurethane polymer is not greater than 30,000, more preferably not greater than 20,000 and especially not greater than 15,000 g/mole.

The solvent-solubilising chain is desirably selected from polyether, polyolefin, polyester or polyacrylate which contains about two functional groups, which react with isocyanate groups, in embodiment 2 and about 1 functional group, which reacts with isocyanate groups to form a chemical bond in embodiment 3. Preferably, the functional group(s) are located at one chain end of the solvent-solubilising chain in both embodiments 2 and 3, and the other chain end doesn't have functional groups reactive with isocyanates. In embodiment 2 it is desirable that said two reactive functional groups are within 1 to 17 polymer backbone atoms of a single terminus of said solvent-solubilising chain and no isocyanate reactive functional groups are located at the other terminus. In embodiment 3, we prefer a single functional group reactive with isocyanates at one end of the solvent-solubilising chain and a non-reactive group (meaning any group is non-reactive with an isocyanate group) at the other terminus. Preferably, the group is a hydroxyl or amine group, more preferably a hydroxyl group. These groups that react with isocyanates include groups with a Zerewitinoff hydrogen. Zerewitinoff hydrogen in urethane chemistry are known to exist on OH, SH, —N(H)—, and $NH_2$. For the purposes of this application, we prefer only the hydroxyl and amine groups that are reactive with isocyanates for the solvent-solubilising chains. The preferred number average molecular weights of the polyether, polyolefin, polyester or polyacrylate are 500-20,000, more preferable 500-10,000 g/mole, more preferably 500-5000 g/mole and most preferably 500-2000 g/mole. In order to control the structure of the dispersant, it is desirable in embodiment 2 that solvent-solubilising chain only has on average 1.5 to 2.0 functional Zerewitinoff hydrogen containing groups that react with the isocyanates (preferably within 1-17 atoms from a terminus of the solvent-solubilizing chain) under the reaction conditions used to form the dispersant (linear anchoring segments). In embodiment 3, it is desirable for a majority of solvent-solubilising chains to only have a Zerewitinoff hydrogen functionality of from about 1.0 to 1.4. In a preferred embodiment 3 it is desirable that at least 50 mole % of the solvent-solubilising chains have a functionality of only one when reacted with isocyanates, more desirably at least 66 mole %, more desirably at least 70 or 90 mole %. Having a functionality of about 1.0 promotes functioning as a terminal solvent-solubilising chain (rather than as chain extenders within polyurethane or as blocks of solvent-solubilising chain between two polyurethane backbones in a block copolymer type structure). Having only one isocyanate reactive group per each solvent-solubilising chain in embodiment 3 promotes the chain being a terminal solubilising group from the anchoring segment rather than a chain extender between two linear anchoring segments.

An inert solvent may be added before, during or after formation of the dispersant in order to control viscosity. Examples of suitable solvents are acetone, methylethylketone, dimethylformamide, dimethylacetamide, diglyme, N-methylpyrrolidone, butylacetate, methoxypropyl acetate, ethylacetate, ethylene and propylene glycol diacetates, alkyl ethers of ethylene and propylene glycol acetates, toluene and xylene. Preferred solvents are ethyl acetate, butyl acetate, methoxy propylacetate. Isocyanate reactive solvents (e.g. alcohols) may be added after the isocyanate groups of the polyisocyanate have reacted with appropriate Zerewitinoff groups on the other reactants. Preferred alcohols are methanol, ethanol, propanol, butanol, hexanol and butoxyethanol. Especially preferred are butoxyethanol and propanol.

In addition to the key components of polyisocyanates, solvent-solubilising chains, and imide containing components to form the polyurethane dispersant, the polyurethane dispersants can include a small amount (generally less than 30, 20, or 10 wt. % of the final polyurethane dispersant) of urethane formative components. These urethane formative components have to have at least one functional group having a Zerewitinoff hydrogen so that they can react with isocyanate groups. The Zerewitinoff hydrogen doesn't have to be part of a hydroxyl group, i.e. it can be part of a —SH, —N(H)—, and NH$_2$. The number average molecular weight of the urethane formative components can be from about 32 g/mole to about 2000, 3000 or 5000 g/mole, although desirable the number average molecular weight of all urethane formative components in the urethane dispersant is less than 500. Common urethane formative components used in the examples are things like isomers of cyclohexanedimethanol. The urethane formative components help connect the various portions of the urethane backbone together by bridging between two isocyanate reactive groups during formation of the dispersant. Urethane formative components used in embodiments 2 and 3 desirably have molecular weights less than 500 g/mole. Urethane formative compounds can be distinguished from solvent-solubilising chains because formative compounds generally have functional groups reactive with isocyanates at both termini while solvent-solubilising chains preferably have all functional groups at one terminus and the other terminus doesn't react with isocyanate groups. Common urethane formative components include diamines or diols. Examples of suitable diamines for component are ethylene diamine, 1,4-butane diamine and 1,6-hexane diamine. Examples of suitable diols for component are 1,6-hexanediol, 1,4-cyclohexanedimethanol (CHDM), 1,2-dodecanediol, 2-phenyl-1,2-propanediol, 1,4-benzene dimethanol, 1,4-butanediol and neopentyl glycol.

These components of the urethane dispersant are generally combined in various orders of addition under substantially anhydrous conditions and in an inert atmosphere which is typically a temperature between 0 and 130° C., optionally in the presence of an inert solvent and optionally in the presence of a catalyst. The inert atmosphere may be provided by any of the inert gases of the Periodic Table but is preferably nitrogen. Particularly preferred catalysts are tin complexes of aliphatic acids such as dibutyl tin dilaurate (DBTDL) and tertiary amines.

Embodiment 2

Embodiment 2 generally describes a comb polyurethane dispersant with an essentially linear polyurethane backbone having pendant functionality wherein some of the pendant groups carry imide groups wherein the carbonyls of the imide group are chemically bonded to carbon atoms of a fused or non-fused aromatic rings and other pendant groups chemically bonded to the polyurethane backbone are solvent-solubilizing chains selected from the group of polyether, polyolefin, polyester, and polyacrylate, or mixtures thereof. Thus the imide groups and the solvent-solubilising chains form the teeth of the comb structure and the polyurethane backbone of the polymer forms the backbone of the comb structure. Desirably, the comb polyurethane dispersant has at least one imide group and in some embodiments at least 2, 3, or 4 or more imide groups of the type described, more desirably from 1, 2, 3, or 4 to 30, more desirably still from 1, 2, 3, or 4 to 25, and preferably from 1, 2, 3, or 4 to 10 or 20. In a preferred embodiment the imide groups are attached to a fused naphthenic type aromatic ring via their carbonyl groups.

To achieve the desired comb structure it is desirable that the polyisocyanate component has an average functionality of about 1.9 to about 2.1 and more desirably about 2.0. Commercially available polyisocyanates tend to have a few dimer, isomers, and partially reacted/degraded isocyanate groups and thus can vary a little from the functionality of the model diisocyanate. Avoiding polyisocyanates of functionality of 3 or more helps to avoid introducing branching in the polyurethane backbone.

Each W' is independently a nitrogen atom, an oxygen atom or a direct bond; W' is the residue of a functional group reacted with an isocyanate group to form a chemical bond, for example W' can be derived from amino, hydroxyl, carboxyl, and the two W' on an aromatic imide can be derived from a dihydroxyl, diamino, or hydroxyl-amine, when b is 2 then one or two of the W' can be derived from a secondary amine reacted with said isocyanate and be in the $R_2$ linking group between the imide and the other W' group, when b is 2 each W' group can be the same or different;

Pol is a polyurethane comprising a urethane reaction product of a diisocyanate having an average functionality about 2.0 reacted with a) one or more polyolefin, polyether, polyacrylate or polyester lateral solvent-solubilising chains having about two functional group reactive with isocyanates at one terminus of the chain and the other terminus of the chain lacking functional groups reactive with isocyantes; and optionally b) with urethane formative compounds having about two Zerewitinoff functional groups.

The polyurethane dispersant is prepared by any known method and is obtained by reacting together a) one or more polyisocyanates having an average functionality about 1.9 to about 2.1 and desirably about 2.0 b) one or more compounds having at least one polyester, polyether, polyacrylate or polyolefin chain and at least two groups which react with isocyanates which are located at one end of the compound such that the polyester, polyether or polyacrylate chain (s) is laterally disposed in relation to the polyurethane polymer backbone;

c) an imide such as shown in Formula 7-9 with two groups reactive towards isocyanates pendant from the polymer back bone and/or an imide as shown in Formula (x) with one group reactive towards isocyanates that behaves as a chain terminator d) optionally, one or more urethane formative compounds having a number average molecular weight of from 32 to 2000 or 3,000 or from 32 to 500 which have at least two groups which react with isocyanates;

e) optionally, one or more compounds which act as chain terminators which contain one group which reacts with isocyanates; optionally, one or more compounds which act as chain terminators which contain a single isocyanate group f) optionally said one or more compounds which act as chain terminators which contain one group which reacts with isocyanates include a reactive group containing a carbon to carbon double bond which is reactive towards vinyl monomers.

When the polyether lateral side chain is a polypropylene oxide) based it is preferably the residue of a polyether that contains one hydroxyl and one secondary amino group. An example is the reaction of the Surfonamine® B series B60 (ethylene oxide to propylene oxide ratio of 1 to 9), B100 (propylene oxide), B200 (ethylene oxide to propylene oxide ratio of 6 to 29) with 2-hydroxyethyl acrylate.

When the polyether lateral side chain is a poly(ethyleneoxide) based it is preferably the residue of polyether that contains one hydroxyl and one secondary amino group. An example is the reaction of the Surfonamine® L series L-100 (propylene oxide to ethylene oxide mix ratio of 3/19), and L-207 (propylene oxide to ethylene oxide mix ratio of 10/32), L-200 (propylene oxide to ethylene oxide mix ratio of 4/41), and L-300 (propylene oxide to ethylene oxide mix ratio of 8/58) with 2-hydroxyethyl acrylate. Another example would be a polyether that contains two hydroxyl groups for example Ymer™ N120 ex Perstorp.

Preferably, the polyester chain is obtainable from lactones by ring opening with an alcohol then reaction with toluene diisocyanate and diethanol amine to make a diol ended polyester. Caprolactone and valerolactone are preferred monomers.

The imide component is desirably derived from reacting an isocyanate terminated species with a functional imide such as shown in Formula 7, 8, or 9. E becomes W' when reacted with isocyanate.

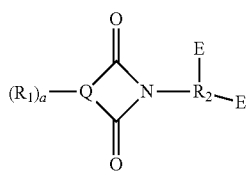

Formula 7

E may be the same group or two different groups selected from —OH, —NH$_2$, —N(H)—, or COOH.

An example of Formula 7 is formed when one molar equivalent of anhydride is reacted with one molar equivalent of 3-amino-1,2-propane diol wherein E is OH at both instances, or diethylene triamine where one E is a NH and the other is a NH$_2$;

Another example is when one molar equivalent of anhydride is reacted with one molar equivalent of 2(3-aminopropylamino)ethanol where one E is a NH and the other is OH as shown in Formula 8;

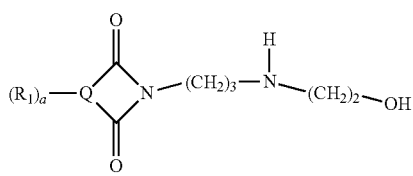

Formula 8

Another example is when an anhydride is reacted with a diamine then subsequently reacted with hydroxyethyl acrylate as shown in Formula 9.

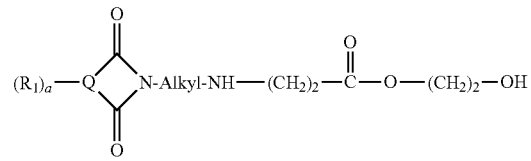

Formula 9

Another example is when 2 molar equivalents of anhydride is reacted with one molar equivalent of triethylene tetramine and in this instance both Es are NH;

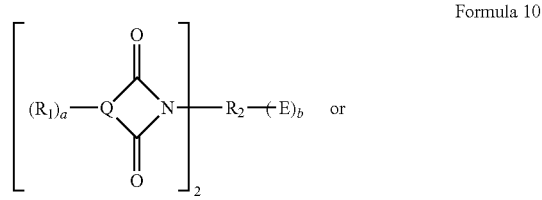

Formula 10

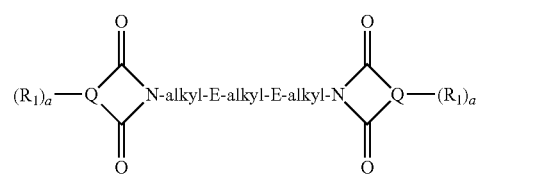

Formula 10

R$_2$ is previously defined as a hydrocarbylene group or hydrocarbonylene group, E is defined as —OH, —NH$_2$, —N(H)— or —CO$_2$H, Formula 10 is synthesised by reacting two molar equivalents of anhydride with one molar equivalent of 1,3 diamino-2-propanol or one equivalent of diethylene triamine.

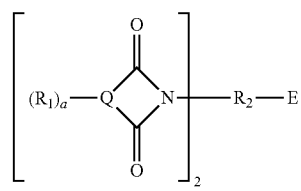

Formula 11

Formula 11 is formed when 2 molar equivalents of anhydride is reacted with one molar equivalent of diethylene triamine where E is an NH

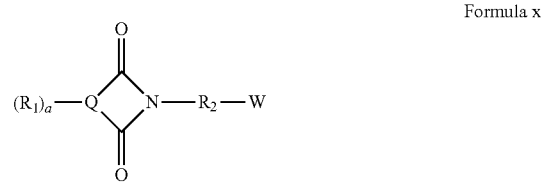

Formula x

An example of Formula x wherein W is a hydroxyl group (—OH) can be prepared by the reaction of an anhydride with an amino alcohol. The aminoalcohol may be ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol. Mixtures of aminoalcohols may be used.

An example of Formula x wherein W is an amino group (—$NHR_3$) can be prepared by the reaction of an anhydride with a diamine as described in Dalton Transactions, 2003, 4537-4545. Examples of diamines include 1-methyl-1,3-propanediamine, n-methylene ethylene diamine, 1,2-diaminoethane, propane-1,3-diamine, butane-1,4-diamine, pentane-1,5-diamine, hexane-1,6-diamine, dodecane-1,12-diamine. Mixtures of diamines may be used.

An example of Formula x wherein W is a carboxylic acid group (—$CO_2H$) can be prepared by the reaction of an anhydride with an aminocarboxylic acid. The aminocarboxylic acid may be 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used.

There are a number of ways of incorporating a polyether lateral chain into an organic compound which contains these groups which react with isocyanates.

Thus, in the case where the two groups which react with isocyanates are both hydroxyl, a poly ($C_{2-4}$-alkylene oxide) chain may be conveniently attached by isocyanates having a functionality of two or more. Compounds of this type are described in U.S. Pat. No. 4,794,147, which involves sequentially reacting a mono-functional polyether with a polyisocyanate to produce a partially capped isocyanate intermediate and reacting the intermediate with a compound having at least one active amino hydrogen and at least two active hydroxyl groups.

One preferred class of compound of this type may be presented by the Formula I.

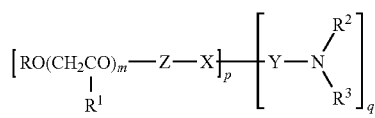

I wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

R may be alkyl, aralkyl, cycloalkyl or aryl.
When R is aralkyl, it is preferably benzyl or 2-phenylethyl.
When R is cycloalkyl it is preferably $C_{3-8}$-cycloalkyl such as cyclohexyl.
When R is aryl it is preferably naphthyl or phenyl.
When R is alkyl, it may be linear or branched and preferably contains not greater than 12, more preferably not greater than 8 and especially not greater than 4 carbon atoms. It is especially preferred that R is methyl or butyl.

The $C_{2-4}$-alkylene radical represented by Z may be ethylene, trimethylene, 1, 2-propylene or butylene.

Preferably m is not less than 10. It is also preferred that m is not greater than 100 and especially not greater than 80.

When q is 2 it is possible to link two different polyurethane polymer chains but it is much preferred that q is 1.

When the polyisocyanate has a functionality which is greater than 2, the compound which is component (b) may carry more than one poly (alkylene oxide) chain. However, it is much preferred that p is 1, q is 1 and that Y is the residue of a diisocyanate.

When $R^1$ is a mixture of hydrogen and methyl and Z is 1, 2-propylene and X is —NH— the compound of Formula I is a derivative of polyalkylene glycol amine such as a Surfonamine® B or L polyetheramines available from Huntsman Corporation.

Preferably, $R^2$ and $R^3$ are both 2-hydroxyethyl.
It is also preferred that X is O.

Compounds of Formula I are typically prepared by reacting a mono-functional polyether with a polyisocyanate in an inert solvent such as toluene at a temperature of from 50 to 100° C. until the desired isocyanate value is reached optionally in the presence of an acid catalyst. In one embodiment, the acid catalyst is present and in another embodiment the acid catalyst is absent. The temperature is then normally reduced to between 40 and 60° C. when the requisite secondary amine such as diethanolamine is added.

Useful compounds of Formula I have been used as component (b) by reacting a poly (propylene glycol) mono methyl ether, a poly (propylene glycol) mono butyl ether or a Surfonamine® B or L series polyetheramines having a number average molecular weight of from 250 to 5,000 with a diisocyanate such as TDI followed by diethanolamine.

A second preferred type of compound which can be used as component (b) is of Formula II.

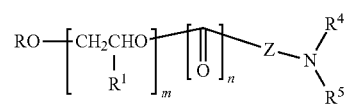

II wherein
R, $R^1$, Z and m are as defined hereinbefore;
$R^4$ is an isocyanate reactive organic radical (group);
$R^5$ is hydrogen or an isocyanate-reactive organic radical; and
n is 0 or 1.

Examples of compounds of Formula 2 are disclosed in EP 317258.

The organic radical represented by $R^4$ and $R^5$ is an organic radical containing an isocyanate-reactive group, such as —OH, —SH, —COOH, —$PO_3H_2$ and —$NHR^6$ in which $R^6$ is hydrogen or optionally substituted alkyl. As specific examples of isocyanate-reactive radicals, there may be mentioned hydroxyalkyl, hydroxy alkoxy alkyl, hydroxy (poly alkylene oxy) alkyl and hydroxy alkoxy carbonyl alkyl.

A preferred type of compound of Formula II is where n is zero, Z is 1,2-propylene, $R^4$ is —$CH_2CH_2C(O)$—O-$(L)_q$-H. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type are obtainable or obtained by the Michael addition reaction of a poly (alkylene oxide) monoalkyl ether monoamine and a hydroxy functional acrylate such as 2-hydroxyethyl acrylate or hydroxypropyl acrylate. A suitable source of poly (alkylene oxide) monoalkyl ether monoamine is the Surfonamine® B or L series of polyethers available from Huntsman Corporation. The reaction between the poly (alkylene oxide) mono alkylether monoamine and 2-hydroxy functional acrylate is typically carried out in the presence of air and at a temperature of 50 to 100° C., optionally in the presence of a polymerisation inhibitor such as hydroquinone or butylated hydroxy toluene.

Another preferred type of compound of Formula II is where n is zero, Z is 1, 2-propylene and $R^4$ and $R^5$ are both 2-hydroxyethyl. Compounds of this type may be prepared by reacting a poly(alkylene oxide) mono alkyl ether mono amine with ethylene oxide under acidic conditions.

Yet another preferred type of compound of Formula II is where n is zero, Z is 1, 2-propylene and $R^4$ is —$CH_2CH_2C$(O)—O-(L)$_q$-H and $R^5$ is hydrogen. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type may be prepared by reacting a poly(alkylene oxide) mono alkyl ether mono amine with about one stoichiometric equivalent of ethylene oxide under acidic conditions.

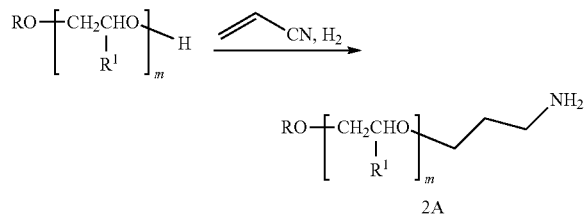

2A

Poly (alkylene oxide) monoalkyl ether monoamines may also be obtained from reaction of a poly (alkylene oxide) monoalkyl ether with acrylonitrile and hydrogen reduction according to the following general scheme where R and $R^1$ are as previously described. A further preferred type of compound of Formula 2 where n is zero, Z is 1, 3-propylene and $R^4$ is 2-hydroxyethyl and $R^5$ is hydrogen may be obtained from reaction between poly (alkylene oxide) monoalkyl ether monoamines of Formula 2A and a hydroxy functional acrylate such as 2-hydroxyethyl acrylate or hydroxypropyl acrylate.

A third preferred type of compound which may be used as component (b) is of Formula III:

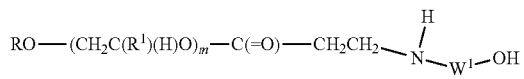

wherein R, $R^1$ and m are as defined hereinbefore and $W^1$ is $C_{2-6}$-alkylene and especially ethylene. Compounds of this type are obtainable or obtained by the Michael addition reaction of a hydroxy amine and a poly (alkylene oxide) acrylate.

A fourth preferred type of compound which may be used as component (b) is of Formula IV.

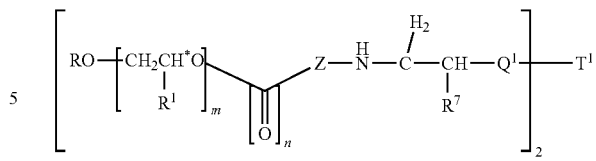

wherein R, $R^1$, Z, m and n are as defined hereinbefore; $R^7$ represents hydrogen, halogen or $C_{1-4}$ alkyl; $Q^1$ is a divalent electron withdrawing group; and $T^1$ is a divalent hydrocarbon radical which may carry substituents or contain hetero atoms.

Examples of electron withdrawing groups which may be represented by $Q^1$ include —CO—, —COO—, —SO—, —$SO_2$—, —$SO_2O$— and —$CONR^8$— in which $R^8$ is hydrogen or alkyl.

Hydrocarbon radicals which may be represented by T' include alkylene, arylene and mixtures thereof, said radicals optionally carrying substituents or containing hetero-atoms. Examples of suitable radicals represented by T' are alkylene radicals containing from 1 to 12 carbon atoms, oxyalkylene and polyoxyalkylene radicals of the formula —$(CH_2CHR^1O)_x$ wherein $R^1$ is as defined hereinbefore and x is from 1 to 10, phenylene and diphenylene radicals and other arylene radicals such as

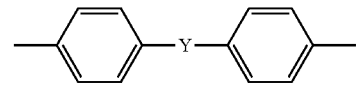

wherein Y is —O—, —S—, —$CH_2$—, —CO— or —$SO_2$—

The compounds of Formula IV are obtainable or obtained by the Michael addition reaction of two moles of a poly (alkylene oxide) monoalkyl ether monoamine with one mole of an unsaturated compound of the Formula V.

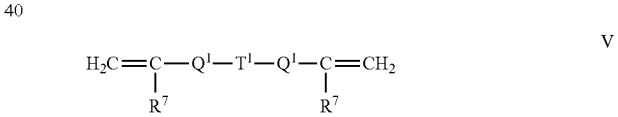

V wherein $Q^1$, $T^1$ and $R^7$ are as defined hereinbefore.

Examples of unsaturated compounds of Formula V are especially diacrylates and dimethacrylates wherein $T^1$ is a $C_{4-10}$-alkylene residue, a polyoxyalkylene residue or an oxyethylated Bisphenol A residue.

Polyester chains can be formed from $C_3$-$C_{18}$ diacids reacted with $C_1$ to $C_{10}$ polyols. Such polyesters from diacids and polyols are well known to the art. Polyester chains derived from lactones and/or hydroxy carboxylic acids are preferred, especially those derived from epsilon-caprolactone, 12-hydroxystearic acid, ricinoleic acid or delta-valerolactone and mixtures thereof. When component (b) is a polyester containing two groups which react with isocyanates the polyester chain may be made by polymerising one or more hydroxy carboxylic acids or lactones thereof in the presence of either a hydroxy or carboxy containing compound which acts as a polymerisation terminating moiety. Preferably the polyester chain is obtainable from lactones by ring opening with an alcohol then reaction with toluene diisocyanate and diethanol amine to make a diol ended polyester. Caprolactone and valerolactone are preferred monomers.

The polyester obtained using a hydroxy containing compound as chain terminating compound is preferably of Formula VI.

wherein
m is as defined hereinbefore;
$R^9$ is $C_{1-50}$-hydrocarbyl group; and
A is $C_{1-26}$-alkylene and/or $C_{2-26}$-alkenylene.

The polyester obtained using a carboxylic containing compound as chain terminating compound is preferably of Formula VII.

wherein
$R^9$, A and m are defined hereinbefore.

The polyester of Formulae VI and/or VII are typically made by reacting one or more hydroxy carboxylic acids together with either a hydroxy containing compound or carboxy containing compound at 50 to 250° C. in an inert atmosphere and in the presence of an esterification catalyst. Typical process conditions are described in WO 01/80987.

Compounds of Formula VI may be reacted with a polyisocyanate and a secondary amine under similar conditions described for the preparation of compounds of Formula I to form polyester analogues.

Compounds of Formula VII may be converted to a mono hydroxy compound by reacting with a diol such as ethylene glycol or propylene glycol and the resulting mono hydroxy derivative treated in similar manner to the compound of Formula VI in preparing polyester analogues to the polyether of Formula I.

A polyester which contains 2 functional groups which are reactive towards an isocyanate at one end of the polyester may be prepared by the Michael addition of an aminoalcohol with a polyester acrylate such as a polycaprolactone acrylate with ethanolamine.

When component (b) is a compound which contains a poly(alk)acrylate chain it is preferably a poly(meth)acrylate containing either two hydroxyl groups at one end of the acrylate chain or one hydroxyl and one imino group at one end of the acrylate chain. The two hydroxyl groups or the one hydroxyl and one imino group are preferably separated by 1 to 6 carbon atoms. Polyacrylates of this type are obtainable or obtained by reacting a diol with an acrylate by, for example, Atom Transfer Radical Polymerisation as illustrated by the following reaction scheme. Reactions of this type are disclosed in Macromolecules 1995, 28, 1721 and 1997, 30, 2190 and in J. Am. Chem. Soc. 1995, 117, 5614.

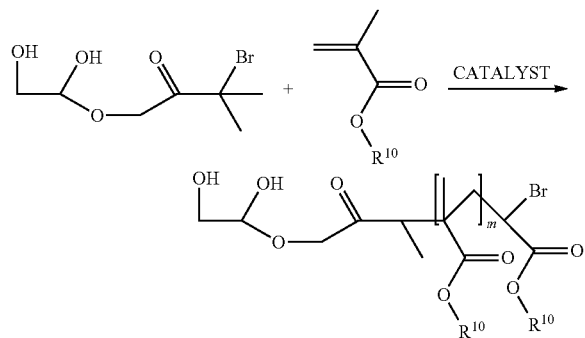

wherein $R^{10}$ is $C_{1-20}$-hydrocarbyl group and m is as defined hereinbefore.

Alternatively, a dihydroxy functional poly(alk)acrylate may be prepared by the free radical polymerisation of a (meth)acrylate monomer(s) in the presence of a dihydroxy functional chain transfer agent such as thioglycerol according to the following reaction scheme.

The reaction is preferably carried out in the presence of an initiator such as azo bis-(isobutyronitrile) (AIBN).

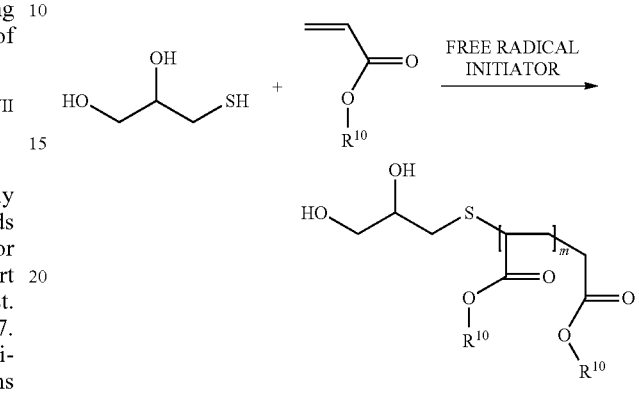

wherein $R^{10}$ and m are as defined hereinbefore.

Monohydroxy functional polymer chains (polyether, polyester or poly(alk)acrylate) may be converted to polymer chains containing both a hydroxyl and imino group at one end by first reaction with an isocyanate functional acrylate followed by a Michael addition of an alkanolamine to the resulting adduct.

The following scheme illustrates such a synthetic conversion starting with a monohydroxy functional polyester.

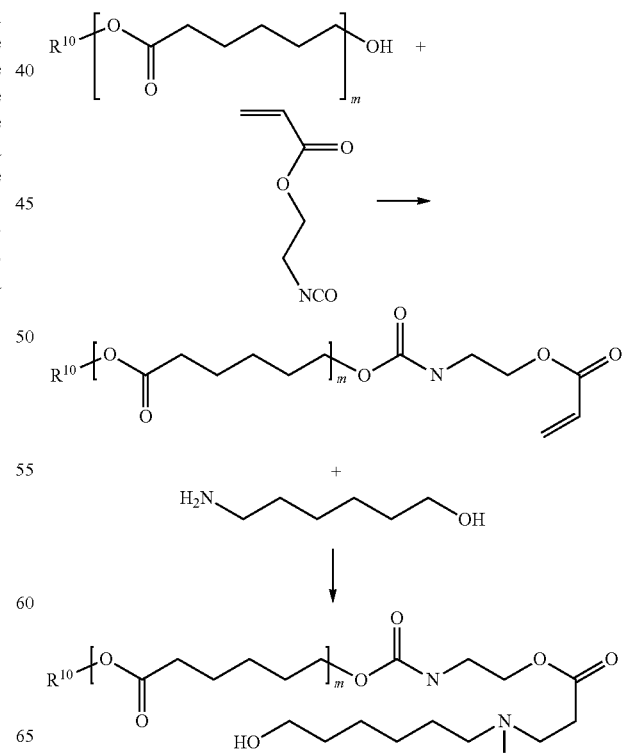

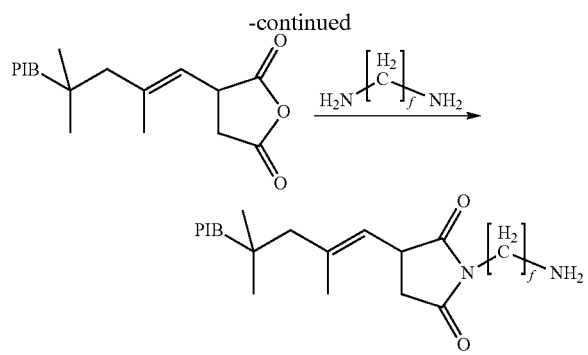

wherein $R^{10}$ and m are as defined hereinbefore.

When solvent-solubilising chain is a compound which contains a polyolefin chain it is preferably a polyolefin containing either two hydroxyl groups at one end of the polyolefin chain or one hydroxyl and one imino group at one end of the polyolefin chain. It is preferred that the polyolefin chain is polyisobutylene. Polyisobutylene chains which contain 2 or more isocyanate reactive groups at one end of the chain may be prepared from polyisobutenyl succinic anhydride (PIBSA). Reaction of PIBSA with an alkyl diamine yields a polyisobutylene with a primary amine on one end. This is illustrated for one type of PIBSA. The primary amine ended polyisobutylene chain may be converted to yield a product with two isocyanate reactive groups by Michael addition of a hydroxy functional acrylate or addition of ethylene oxide in an analogous way to that described above for poly (alkylene oxide) monoalkyl ether monoamines.

Embodiment 3

Embodiment 3 is generally a block copolymer with blocks of a solvent-solubilizing chain and blocks of polyurethane. The polyurethane blocks desirably have the imide (wherein the carbonyl groups of the imide are attached to a fused or non-fused aromatic ring, optionally substituted) pendant from the polyurethane blocks. The block copolymers are desirably between 2000 and 30,000, more desirably between 2000 and 20,000 g/mole molecular weight and have 1, 2, 3, or 4 or more pendant imide groups, as described later, pendant (also defined as laterally attached) from polyurethane blocks. Desirably, the solvent-solubilising blocks are terminal and optionally a portion of the solvent-solubilising blocks can be located as a segment in the backbone between two polyurethane blocks.

The reactant to form the W' segment of the imide is desirably the reaction product of a chemical bond forming reaction (or a reaction product) of a dihydroxy and diamine or hydroxyl-amino group with an isocyanate group. Often the amino group of the hydroxyl-amino group is a secondary amine. The hydroxyl groups can be primary or secondary. Primary and secondary hydroxyl and amino groups have different reactivity with isocyanate groups so the use of mixtures of primary and secondary hydroxyl and amino groups can be used to control which groups react with the isocyanate first. When the reactant to form the W' segment (residue of the reactant to form W'). is a dihydroxyl compound, then W' is the same compound less the two hydrogen atoms from the hydroxyl groups. When the reactant to form W' is of the diamine type or hydroxyl-amino type, then the W' formed is the same reactant without the two hydrogen atoms lost in the reaction with two isocyanate groups.

Pol is a polyurethane block copolymer comprising a reaction product of a diisocyanate having an average functionality of about 1.9 to about 2.1, more desirably about 2.0 with a) solvent-solubilising having a functionality of (when reacted with isocyanates) of about 1.0 to about 1.4 comprising poly(1-2-olefin), polyether, polyacrylate or polyester or combinations thereof; and c) optionally other isocyanate reactive species (urethane formative compounds) common to polyurethane formation selected from the group of diols or diamines of molecular weight desirably of 32 to 500 or 3,000 g/mole, diols and optionally monofunctional hydroxyl and amine compounds of less than 500 g/mole molecular weight that can function as terminal groups. The need for monofunctional reactants of less than 500 g/mole molecular weight is minimal in this embodiment 2 as the solvent-solubilising chains are the preferred terminal groups of the dispersant in this embodiment 3.

A small percentage of the solvent-solubilising chains may have two functional groups (reactive with isocyanates to form chemical bonds) and these difunctional solvent-solubilising chains can be used as dispersant backbone forming chains between urethane backbone segments in the dispersant (e.g. about 60 mole % monofunctional and 40 mole % difunctional gives an average functionality of about 1.4 and would be theorized to give a blend of block copolymers with mostly 3 blocks and some copolymers with 5 blocks).

The polyether chains in this embodiment (polyethers are also known as polyalkylene glycol) may be a random or block (co)polymer containing repeat ethyleneoxy, propyleneoxy or butyleneoxy groups, including mixtures thereof. The alkylene moiety of the ($C_{2-4}$-alkylene oxide) group may be linear or preferably branched and may be obtained by (co)polymerisation of alkylene oxides such as ethylene oxide, propylene oxide and butylene oxide or from ring opening polymerisation of tetrahydrofuran. Copolymers may be random or block copolymers. Preferably, the polyether chain is obtainable from propylene oxide. It is also preferred that the polyether chain of the dispersant is obtainable from a poly($C_{2-4}$-alkylene oxide) mono-$C_{1-10}$-alkyl ether and especially a $C_{1-4}$ alkyl ether such as methyl or butyl ether. Poly(ethylene oxide) rich solvent-solubilising chains are desirable for aqueous media and polypropylene oxide) rich solvent-solubilising chains are desirable for polar organic media.

In one embodiment, where the solvent-solubilising chain (is a polyacrylate (sometimes referred to as polyacrylic), it is preferably obtained from the polymerisation of an alkyl acrylate or alkyl methacrylate. The poly alkyl(meth)acrylate may be prepared by the free radical polymerisation of (meth) acrylate monomer(s). The polyacrylate may be prepared in the presence of a monohydroxy functional chain transfer agent for example mercaptoalcohols to impart mono-functionality. Other vinyl monomers such as styrene, vinyl esters, etc., could be copolymerized into the polyacrylate provided that they do not significantly negatively affect solubility in the selected solvent system for the dispersant or interact negatively aromatic imide. In one embodiment, the non-acrylate monomers are less than 30, less than 20 and less than 10 mole percent of the total repeating units of the polyacrylate (i.e. the polyacrylate is at least 70, 80, or 90 mole percent repeat units characterized as the expected repeat units associated with the radical polymerization of acrylate monomers). Preferably, the mercaptoalcohols include 2-mercaptoethanol, 1-mercapto-2-propanol, 3-mercapto-1-propanol, 1-mercapto-2-propanol, 4-mercapto-1-butanol, 6-mercapto-1-hexanol, 4-mercaptophenol. Preferably, the polymerisation can be performed in the presence of a non-functional radical initiator, for example, azo type initiators. Examples of suitable azo initiators include 2,2'-azobis(4-methoxy-2,4-dimethylvaleronitrile), 2,2'-azobis(2,4-dimethyl-valeronitrile, 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-(carbamoylazo)-isobutyronitrile, 2,2'-azobis(2,4,4-trimethyl-pentane. The preferred initiators are 2,2'-azobisisobutyronitrile, and 1,1'-azobis(1-cyclohexanecarbonitrile). To obtain a higher hydroxyl content polymer, a mercaptoalcohol can be used in the presence of a hydroxyfunctional initiator, for example, 2,2'-azobis[2-methyl-N-(2-hydroxyethyl) propionamide].

Alternatively, the poly alkyl(meth)acrylate may be prepared by any polymerisation technique such as Ionic Polymerisation, Group Transfer Polymerisation (GTP), Atom Transfer Radical Polymerisation (ATRP), Nitroxide Mediated Radical Polymerisation (NMRP) or Radical Addition Fragmentation Polymerisation (RAFT) using a functional initiator or chain terminator that has one group reactive with isocyanates, for example, hydroxyl functional RAFT agents. RAFT agents are disclosed in numerous publications such as WO 2006/020281 and U.S. Pat. No. 7,279,591.

In one embodiment, with a relative non-polar media is used for the dispersant, the solvent-solubilising chains may be polyolefins such as derived from polymerizing and copolymerizing $C_2$-$C_{20}$ olefins including diolefins and various non-substituted and alkyl-substituted styrenes. These polymers are well known to the art. One preferred polymer is polyisobutylene. These polymers can be readily functionalized at one terminus with a hydroxyl or amino group such as already disclosed for embodiment 2.

Polyester chains can be formed from $C_3$-$C_{18}$ diacids reacted with $C_1$ to $C_{10}$ polyols. Such polyesters from diacids and polyols are well known to the art. Polyester chains derived from lactones and/or hydroxy carboxylic acids are preferred, especially those derived from epsilon-caprolactone, 12-hydroxystearic acid, ricinoleic acid or delta-valerolactone and mixtures thereof. Such a polyester is also known as a poly(oxyalk(en)ylene carbonyl) chain (hereinafter POAC chain) where the alk(en)ylene has from 1 to 17 carbon atoms and can be linear or branched and can optionally include a carbon-to-carbon bond (the (en) in the name indicates an optional carbon to carbon double bond). The oxyalk(en)ylene carbonyl can exist in the left to right or right to left version in the polymer (meaning that the carbonyl group can come first or the oxy group can be first in the repeat unit. It is particularly preferred that the polyoxyalkylene chain is derivable from two different hydroxycarboxylic acids or lactones thereof.

Preferably, the poly(oxyalkylenecarbonyl) chain contains $C_{1-7}$-alkylene groups. The nature of the chain length can be varied between wide limits depending on whether the dispersant is to be used to disperse a particulate solid in a polar or non-polar medium. Thus, when the dispersant is to be used to disperse a particulate solid in a non-polar medium, preferably one or more of the hydroxy carboxylic acids contains a $C_{7-17}$-alk(en)ylene group and when the dispersant is to be used to disperse a particulate solid in a polar medium it is preferred that one or more and especially all of the hydroxy carboxylic acids or lactones thereof contains a $C_{1-6}$-alkylene group.

The POAC chain may be prepared by first reacting a hydroxy carboxylic acid with the isocyanate group (s) of the polyisocyanate followed by copolymerisation with addition hydroxy carboxylic acid or lactone thereof to build the POAC chain. However, it is preferable to first prepare the POAC compound and to react this with the isocyanate group (s) of the polyisocyanate. In this case it is preferable to carry out the copolymerisation of the hydroxy carboxylic acid or lactone thereof in the presence of a polymerisation chain terminator. The chain terminator may contain a thiol, primary or secondary amino group, but preferably contains a hydroxy group. The POAC compound derived from two different hydroxycarboxylic acids or lactones thereof and which contains a chain terminator attached to the POAC chain via the carbonyl group is a compound of Formula VIII.

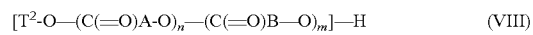

wherein
$T^2$ is a chain terminating group;
A and B are different $C_{1-17}$-alk(en)ylene;
n and m are independently 0 or positive integers; and
n+m is from 2 to 200.

Copolymerisation of the hydroxy carboxylic acid or lactone thereof results in a POAC chain having a terminal hydroxy group and a terminal carboxylic acid group. (Hereinafter POAC compound). The POAC compound may be reacted at either the hydroxy and/or carboxylic acid group with a compound containing a functional group which undergoes an addition reaction with isocyanates such as hydroxy, thiol or amino groups. It is preferred, however, that the POAC compound undergoes an addition reaction with the polyisocyanate via the hydroxy group of the POAC compound.

The POAC compound of Formula a is hereinafter referred to as a TPOAC alcohol. As noted hereinbefore, the chain terminator preferably contains a hydroxy group when the different hydroxycarboxylic acids or lactones thereof are copolymerised in the presence of $T^2$-OH. $T^2$ is optionally substituted $C_{1-35}$-hydrocarbyl and may be aromatic, alicyclic, heterocyclic or aliphatic which may be linear or branched, saturated or unsaturated. Preferably, $T^2$ contains not greater than 20 carbon atoms and more preferably not greater than 10 carbon atoms.

Optional substituents on $T^2$ include halogen, $C_{1-6}$-alkoxy, ester (i.e. —OCO—), amide, urethane and ether groups. When $T^2$-OH contains one or more ether groups it is preferably derivable from propylene and/or ethylene oxide. Thus, $T^2$-OH may be a monohydric alcohol or phenol which is (co) polymerised with propylene and/or ethylene oxide. Examples of monohydric alcohols are $C_{1-20}$-aliphatic alcohols which may be linear or branched, saturated or unsaturated such as phenoxyethanol, octanol, $C_{1-16}$-fatty alcohols, nonanol, ethanol, butanol and methanol. Examples of phenols (co) polymerised with propylene and/or ethylene oxide are nonylphenol and naphthol.

In a preferred class of dispersants, $T^2$ is $C_{1-35}$-alkyl, more preferably $C_{1-20}$-alkyl and especially $C_{1-10}$-alkyl.

The total weight percentage of the solvent-solubilising terminal chains (e.g., polyether, polyester, polyolefin and/or polyacrylate) in the polyurethane dispersant in one embodiment is preferably not less than 5%, in another embodiment not less than 20%, more preferably not less than 30% and especially not less than 40% by weight of the polyurethane dispersant. It is also preferred that the total weight percentage of solvent-soluble terminal chains in the polyurethane dispersant is not greater than 80%, more preferably not greater than 70%, especially not greater than 60% based on the weight of the dispersant. In one embodiment, the total weight percentage of solvent-soluble terminal chains in the polyurethane dispersant is not greater than 60%, for instance 40% to 60%. The weight percentages above are not meant to include solvent-solubilising chains characterized as having isocyanate reactive groups at both ends of the chain and being incorporated into the dispersant between two polyurethane backbone segments.

The polyurethane dispersant is prepared by any known method and is obtained by reacting together a) one or more polyisocyanates having an average functionality about 1.9 to about 2.1 and more desirably about 2.0;

b) an imide wherein each of the carbonyls of the imide are attached to a fused or non-fused aromatic ring and the nitrogen of the imide is attached to $R_2—(W')_b—$ where b is two and the imide has two functional groups reactive with isocyanates such as hydroxyl or amine and optionally an imide that is a chain terminator with one functional group reactive to isocyanates where b is 1.

c) one or more solvent-solubilising chain compounds which act as chain terminators which contain one group which reacts with isocyanates; the chain terminators are polyolefin, polyether, polyacrylate or polyester polymers or mixtures of these d) optionally, one or more urethane formative compounds having a number average molecular weight of from 32 to 2,000 or 3,000 which have at least two groups which react with isocyanates (urethane formative compounds will be defined as compounds that react with isocyanates to form chemical bonds).

Imide Synthesis

The imide component can be synthesized by reacting an aromatic anhydride with a primary nitrogen bearing molecule with an additional one or two isocyanate reactive functional group such as hydroxyl, secondary amine, carboxylic acid, —SH, or in some cases an additional primary amine. The imide is prepared in the melt or in solvent, at temperatures between 100-200° C. The synthesis may involve a volatile solvent (bpt<100° C.) to improve mixing of reagents, which is then distilled as the temperature is raised above the boiling point of this solvent.

Preferably the imide is prepared in the polymerisation solvent to avoid isolation of this intermediate. The maximum reaction temperature depends on the boiling point of this solvent, examples of suitable solvents are toluene (bpt=110-111° C.), xylene (bpt=137-140° C.), propylene glycol monomethyl ether acetate (bpt=145-146° C.), dipropylene glycyol methyl ether acetate (bpt=200° C.), diethylene glycol dibutyl ether (bpt=256° C.), tetraethylene glycol dimethyl ether (bpt=275-276° C.) or mixtures thereof. The imide may also be prepared using the solvent-solubilizing chain as a diluent providing that the group located at the chain end of the solvent-solubilizing chain does not react with the anhydride.

Preferably the imide is formed before reaction with the diisocyanate(s), if a mixture of amide and imide is present, the amide may convert to imide during the polymerisation process or after the polymerisation process by prolonged heating. A catalyst may be necessary to achieve high conversion of imide and some amide may still be present in the final product.

The reaction is shown below for various starting materials. 3-Amino 1,2 propane diol reacted with an aromatic anhydride;

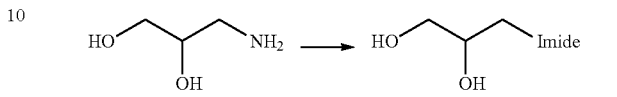

1,3 Diamino-2-propanol reacted with an aromatic anhydride;

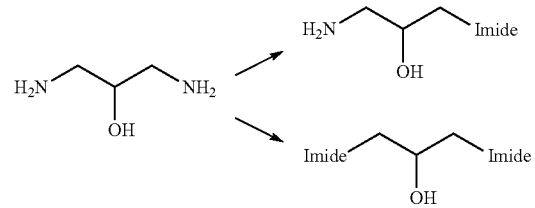

Diethylene triamine reacted with an aromatic anhydride;

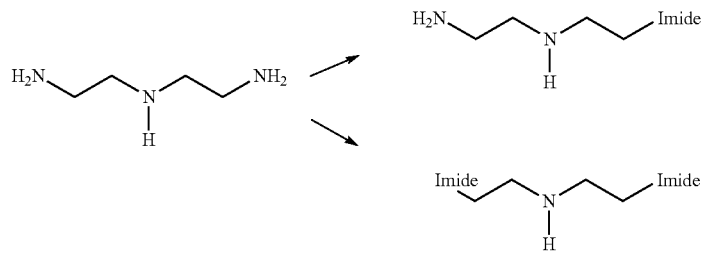

Diethylene tetramine reacted with an aromatic anhydride;

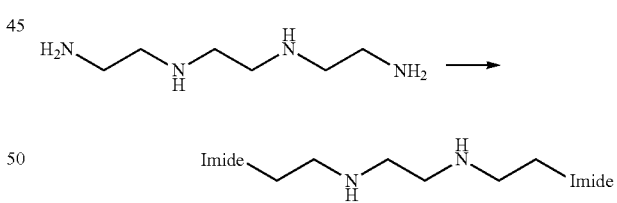

2-(3-Aminopropylamino)ethanol with an aromatic anhydride

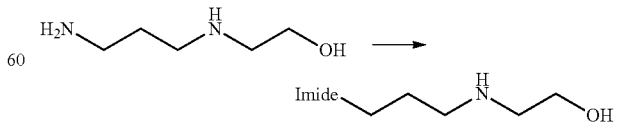

The imide component is desirably derived from reacting an isocyante terminated species with a functional imide such as shown in 7, 8, 9, or 10.

Formula 7

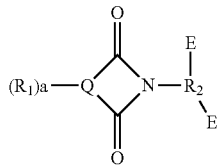

E may be the same group or two different groups selected from —OH, —NH$_2$, —N(H)—, or COOH.

An example of Formula 7 is formed when one molar equivalent of anhydride is reacted with one molar equivalent of 3-amino-1,2-propane diol wherein E is OH at both instances, or diethylene triamine where one E is a NH and the other is a NH$_2$;

Another example is when one molar equivalent of anhydride is reacted with one molar equivalent of 2(3-aminopropylamino)ethanol where one E is a NH and the other is OH as shown in Formula 8;

Formula 8

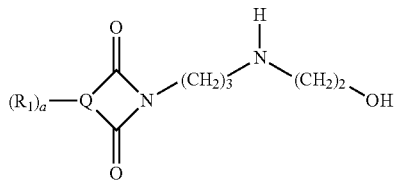

Another example is when an anhydride is reacted with a diamine then subsequently reacted with hydroxyethyl acrylate as shown in Formula 9.

Formula 9

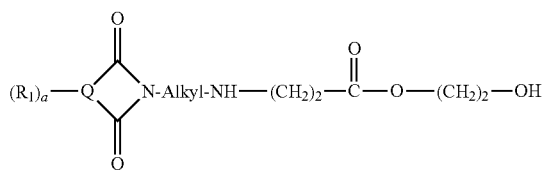

Another example is when 2 molar equivalents of anhydride is reacted with one molar equivalent of triethylene tetramine and in this instance both Es are NH; Formula 10

Formula 10

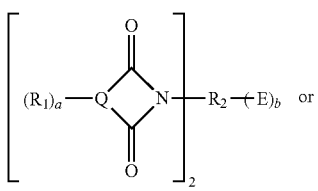

Formula 10

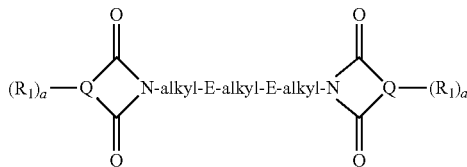

$R_2$ is previously defined as a hydrocarbylene group or hydrocarbonylene group,
E is defined as —OH, —NH$_2$, —N(H)— or —CO$_2$H,
Formula 10 is synthesised by reacting two molar equivalents of anhydride with one molar equivalent of 1,3 diamino-2-propanol or one equivalent of diethylene triamine.

Formula 11

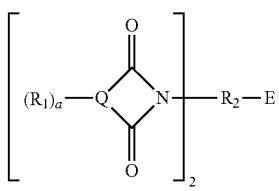

Formula 11 is formed when 2 molar equivalents of anhydride is reacted with one molar equivalent of diethylene triamine where E is an NH Examples of anhydrides are phthalic anhydride such as phthalic anhydride (when $R^1$=H), 4-nitro-phthalic anhydride or 3-nitro-phthalic anhydride (when one $R^1$=NO$_2$), 4-chloro-phthalic anhydride or 3-chloro-phthalic anhydride (when one $R^1$=Cl) group, 4-sulpho-phthalic anhydride or 3-sulpho-phthalic anhydride (when one $R^1$=SO$_3$H), tetrachloro and tetrabromo phthalic anhydrides, 3-bromo phthalic anhydride, 4-bromo phthalic anhydride, or mixtures thereof.

Industrial Application for Embodiments 1, 2, and 3

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3, or 5 microns, or 20 nanometers to 1, 2, 3, or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezoceramic printing, refactories, abrasives, foundry, capacitors, fuel cells, ferrofluids, conductive inks, magnetic recording media, water treatment and hydrocarbon soil remediation; organic and inorganic nanodisperse solids; metal, metal oxides and carbon for electrodes in batteries, fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermo-setting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid is free of water.

The plastics material may be a thermosetting resin or a thermoplastic resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods. Examples of a suitable thermoplastic include (low density, or linear low density or high density) polyethylene, polypropylene, polystyrene, polyethylene terephthalate (PET), polybutylene terephthalate (PBT), nylon 6, nylon 6/6, nylon 4/6, nylon 6/12, nylon 11 and nylon 12, polymethylmethacrylate, polyethersulphone, polysulphones, polycarbonate, polyvinyl chloride (PVC), thermoplastic polyurethane, ethylene vinyl acetate (EVA), Victrex PEEK™ polymers (such as oxy-1, 4-phenylenoeoxy-1, 4-phenylene-carbonyl-1, 4-phenylene polymers) and acrylonitrile butadiene styrene polymers (ABS); and various other polymeric blends or alloys.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

If desired, the compositions containing plastic material may contain other ingredients, for example dispersants other than the compound of the present invention, antifogging agents, nucleators, blowing agents, flame retardants, process aids, surfactants, plasticisers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

The composition of the present invention is particularly suited to liquid dispersions. In one embodiment, such dispersion compositions comprise:
a) from 0.5 to 80 parts of a particulate solid;
b) from 0.1 to 79.6 parts of a polymer of Formula (1); and
c) from 19.9 to 99.4 parts of an organic liquid and/or water;
wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 100%, not greater than 50%, not greater than 20% or not greater than 10% by weight of dispersant of Formula (1) based on the weight of the particulate solid.

As disclosed hereinbefore, the compositions of the invention are suitable for preparing millbases wherein the particulate solid is milled in an organic liquid in the presence of a compound for Formula (1).

Thus, according to a still further aspect of the invention there is provided a millbase comprising a particulate solid, an organic liquid and a polymer of Formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for colour filter systems in displays including organic light-emitting diode (OLED) devices, liquid crystal displays and electrophoretic displays, glass coatings including optical fibre coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions In one embodiment, the composition of the invention further includes one or more additional known dispersants.

EXAMPLES

Intermediate A

Amino polyether (200 parts by wt., Surfonamine® B200, ex Huntsman), 2-hydroxyethyl acrylate (11.61 parts) and 2,6-di-tertbutyl-4-methyl phenol (0.03 parts) were stirred together at 70° C. for 48 hours. The product obtained was a yellow liquid.

Intermediate B

1-Dodecanol (57.24 parts), ε-caprolactone (336.70 parts) and δ-valerolactone (104.57 parts) were stirred together under nitrogen at 100° C. Zirconium butoxide (1.68 parts) was added and the reactants were stirred under nitrogen for 18 hours at 175° C. After cooling to 20° C., the product was obtained as a waxy solid with Mn=1600 and Mw=2100 as determined by GPC (tetrahydrofuran eluent, polycaprolactone standards).

Intermediate C

1-Dodecanol (119.58 parts) and ε-caprolactone (842.39 parts) were stirred together under nitrogen. Titanium butoxide (2.57 parts) was added and the reactants were heated to 175° C. for 8 hours. After cooling to 20° C., the product was obtained as a waxy solid with Mn=1600 and Mw=2200 as determined by GPC (tetrahydrofuran eluent, polycaprolactone standards).

Intermediate D

Polyethylene glycol mono methyl ether amine (199.3 parts, Surfonamine® L100 ex Huntsman) was stirred at 70° C. in the presence of air. 2-Hydroxyethyl acrylate (20.7 parts) was added with butylated hydroxyl toluene (0.021 parts). The reaction was continued by stirring in air at 70° C. for 6 hours. The product was obtained as a waxy solid.

Intermediate E

Amino polyether (376.48 parts, Surfonamine® B60, ex Huntsman), 2-hydroxyethyl acrylate (76.58 parts) and 2,6-di-tertbutyl-4-methyl phenol (0.05 parts) were stirred together at 70° C. for 18 hours. The product obtained was a yellow liquid.

Intermediate F

1-Dodecanol (56.5 parts), ε-caprolactone (242.12 parts) and δ-valerolactone (212.38 parts) were stirred together under nitrogen at 100° C. Zirconium butoxide (1.53 parts) was added and the reactants were stirred under nitrogen for 18 hours at 180° C. The product was obtained as yellow liquid with Mn=2200 an Mw=4900 as determined by GPC (tetrahydrofuran eluent, polystyrene standards).

Intermediate G

1-Dodecanol (13.2 parts), ε-caprolactone (200 parts) and zirconium butoxide (1.1 parts) were stirred under nitrogen for 1 hours at 125° C. The reaction was then heated to 180° C. for 18 hours. After cooling to 20° C., the product was obtained as a waxy solid with Mn=4500 an Mw=10600 as determined by GPC (tetrahydrofuran eluent, polystyrene standards).

Intermediate H

Tolylene-2,4-diisocyanate (8.73 parts) and propylene glycol monomethyl ether acetate (133.45 parts) were heated to 50° C. under nitrogen. Hydroxy polyester (75 parts, intermediate C) was added, and the reaction heated to 90° C. for 75 minutes. The reaction was cooled to 30° C. and diethanolamine (5.27 parts) was charged. The reaction was heated at 30° C. for 30 minutes until no isocyanate was present as determined by IR. The product was obtained as an amber liquid with Mn=2300 and Mw=2700 as determined by GPC (tetrahydrofuran eluent, polycaprolactone standards).

Comparative Example 1 (CE1)

Propylene glycol monomethyl ether acetate (152.84 parts by weight) and tolylene-2,4-diisocyanate (20.52 parts) were stirred under nitrogen at ambient temperature. Hydroxyamino polyether (73.74 parts, Intermediate A) and 1,1'-{[3-(dimethylamino)-propyl]imino}bis-2-propanol (15.78 parts) was added and the reaction was heated to 70° C. Amino polyether (42.84 parts Surfonamine® B200 ex Huntsman) was added and the reaction stirred at 70° C. for 2 hours. 100 parts of the product was removed from the reaction vessel. GPC analysis of this material gave Mn=4900 and Mw=14800 (tetrahydrofuran eluent, polystyrene standards). Benzyl chloride (5.42 parts) and propylene glycol monomethyl ether acetate (5.42 parts) were charged to the remaining mixture. The reaction was heated at 70° C. for 16 hours. The product was an amber liquid.

Comparative Example 2 (CE2)

1,8-Naphthalic anhydride (29.73 parts) and amino polyether (150 parts, Surfonamine® L100 ex Huntsman) were heated to 110° C. for 6 hours, then 150° C. for 15 hours. On cooling the product was a brown waxy solid. The IR was consistent with imide formation and the final product had acid value 0.96 mg KOH g$^{-1}$.

Example 1

3-Amino-1,2-propane diol (1.53 parts by weight) and propylene glycol mono methyl ether acetate (30.35 parts) were stirred under nitrogen at 120° C. 1,8-Naphthalic anhydride (3.23 parts) was added over 10 minutes and the mixture stirred for a further 2 hours at 120° C. The reaction was cooled to 70° C. and hydroxyamino polyether (42.35 parts, Intermediate A), 1,4-cyclohexanedimethanol (0.55 parts), amino polyether (16.04 parts Surfonamine® B200 ex Huntsman) and propylene glycol mono methyl ether acetate (40.69 parts) were added. Tolylene-2,4-diisocyanate (7.68 parts) was added over 5 minutes and the reaction mixture was heated to 120° C. for 1 hour. The reaction was then cooled to 90° C., dibutyltin dilaurate (0.05 parts) added and the mixture stirred under nitrogen for 1 hour at 90° C. until no isocyanate was present as determined by IR. The resulting product was an amber liquid with Mn=5100 and Mw=19500 as determined by GPC (Tetrahydrofuran eluent, polystyrene standards).

Example 2

3-Amino-1,2-propane diol (1.33 parts by weight) and propylene glycol monomethyl ether acetate (50 parts) were stirred under nitrogen at 120° C. 1,8-Naphthalic anhydride (2.80 parts) was added over 10 minutes, followed by propylene glycol monomethyl ether acetate (14.03 parts), and the reaction mixture was stirred for 2 hours. The reaction was then cooled to 70° C. and hydroxyamino polyether (41.25 parts, intermediate A), 1,4-cyclohexanedimethanol (1.66 parts) and amino polyether (9.03 parts Surfonamine®

B200 ex Huntsman) were added. Tolylene-2,4-diisocyanate (8.25 parts) was added over 5 minutes and the reaction was heated to 90° C. for 9 hours. Dibutyl tin dilaurate (0.05 parts) was added and the reaction was stirred at 90° C. for a further 1 hour until no isocyanate present as determined by IR. The resulting product was an amber liquid with $Mn=8400$ and $Mw=31000$ as determined by GPC (tetrahydrofuran eluent, polystyrene standards).

Example 3

3-Amino-1,2-propane diol (1.06 parts by weight) and propylene glycol monomethyl ether acetate (30 parts) were stirred under nitrogen at 120° C. 1,8-Naphthalic anhydride (2.3 parts) was added over 10 minutes followed by propylene glycol mono methyl ether acetate (10 parts). The reaction mixture was stirred for 1 hour at 120° C. The reaction was then cooled to 70° C. and hydroxyamino polyether (50.78 parts, intermediate A), 1,4-cyclohexanedimethanol (1.27 parts) and propylene glycol mono methyl ether acetate (35.29 parts) were added. Tolylene-2,4-diisocyanate (8.24 parts) was added over 5 minutes and the reaction was stirred at 70° C. for 6 hours. Aminopolyether (11.58 parts, Surfonamine® B200 ex Huntsman) was added and the reaction stirred at 70° C. for 3 hours. Dibutyltin dilaurate (0.06 parts) was added and the reaction mixture stirred under nitrogen for 1 hour at 70° C. until no isocyanate present as determined by IR. The resulting product was an amber liquid with $Mn=11000$ and $Mw=20000$ as determined by GPC (tetrahydrofuran eluent, polystyrene standards).

Example 4

3-Amino-1,2-propane diol (1.05 parts by weight) and propylene glycol monomethyl ether acetate (30 parts) were stirred under nitrogen at 120° C. 3-Nitro-1,8-naphthalic anhydride (2.80 parts) was added over 10 minutes, followed by propylene glycol monomethyl ether acetate (10 parts), and the reaction mixture was stirred for 85 minutes at 120° C. Additional 3-amino-1,2-propane diol (0.1 g) was added and the reaction stirred for 20 minutes at 120° C. The reaction was then cooled to 70° C. and hydroxyamino polyether (50.34 parts, intermediate A), 1,4-cyclohexanedimethanol (1.27 parts) and propylene glycol monomethyl ether acetate (35.2 parts) were added. Tolylene-2,4-diisocyanate (8.18 parts) was added over 5 minutes and the reaction was stirred at 70° C. for 8 hours. Amino polyether (11.5 parts, Surfonamine® B200 ex Huntsman) was added and the reaction stirred at 70° C. for 3 hours. Dibutyl tin dilaurate (0.06 parts) was added and the reaction was stirred at 70° C. for 1 hour until no isocyanate present as determined by IR. The resulting product was a dark brown liquid with $Mn=13000$ and $Mw=33000$ as determined by GPC (tetrahydrofuran eluent, polystyrene standards).

Example 5

3-Amino-1,2-propane diol (1.15 parts by weight) and propylene glycol monomethyl ether acetate (20 parts) were stirred under nitrogen at 120° C. 1,8-Naphthalic anhydride (2.52 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A), 1,4-cyclohexanedimethanol (4.13 parts) and propylene glycol monomethyl ether acetate (33.77 parts) were added. Tolylene-2,4-diisocyanate (11.4 parts) was added over 5 minutes and the reaction was stirred at 90° C. for 6 hours. Hydroxy polyester (10.11 parts, intermediate B) was added and the reaction stirred at 90° C. for 3 hours. 1,8-diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was a hazy amber liquid with $Mn=3800$ and $Mw=7000$ as determined by GPC (tetrahydrofuran eluent, polystyrene standards).

Example 6

3-Amino-1,2-propane diol (2.27 parts by weight) and propylene glycol monomethyl ether acetate (20 parts) were stirred under nitrogen at 120° C. 1,8-Naphthalic anhydride (4.95 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A), 1,4-cyclohexanedimethanol (0.57 parts) and propylene glycol monomethyl ether acetate (27 parts) were added. Isophorone diisocyanate (11.65 parts) was added over 5 minutes and the reaction was stirred at 90° C. for 6 hours. Amino polyether (2.99 parts, Surfonamine® B60 ex Huntsman) was added and the reaction stirred at 90° C. for 3 hours. 1,8-Diazabicyclo[5.4.0] undec-7-ene (0.12 parts) was added and the reaction was stirred at 90° C. for 1 hour until no isocyanate present as determined by IR. The reaction was then heated to 120° C. for 3 hours. The resulting product was a brown liquid with $Mn=3100$ and $Mw=9000$ as determined by GPC (tetrahydrofuran eluent, polystyrene standards).

Example 7

3-Amino-1,2-propane diol (2.12 parts by weight) and propylene glycol monomethyl ether acetate (20 parts) were stirred under nitrogen at 120° C. 1,8-Naphthalic anhydride (4.62 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A), 1,6-hexanediol (1.63 parts) and propylene glycol monomethyl ether acetate (41.3 parts) were added. Tolylene-2,4-diisocyanate (11.07 parts) was added over 5 minutes and the reaction was stirred at 90° C. for 6 hours. Hydroxy polyester (17.33 parts, Intermediate C) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was a hazy amber liquid with $Mn=2500$ and $Mw=5400$ as determined by GPC (tetrahydrofuran eluent, polystyrene standards).

Example 8

3-Amino-1,2-propane diol (2.61 parts by weight) and propylene glycol monomethyl ether acetate (20 parts) were stirred under nitrogen at 120° C. 1,8-Naphthalic anhydride (5.67 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A) and propylene glycol monomethyl ether acetate (83.6 parts) were added. Tolylene-2,4-diisocyanate (11.23 parts) was added over 5 minutes and the reaction was stirred at 90° C. for 6 hours. Amino polyether (59.52 parts, Surfonamine® B200 ex Huntsman) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was a hazy amber liquid with Mn=3100 and Mw=6000 as determined by GPC (tetrahydrofuran eluent, polystyrene standards).

Example 9

3-Amino-1,2-propane diol (0.92 parts by weight) and propylene glycol monomethyl ether acetate (20.16 parts) were stirred under nitrogen at 120° C. 1,8-Naphthalic anhydride (2 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A), 1,4-cyclohexanedimethanol (2.86 parts) and propylene glycol monomethyl ether acetate (33.83 parts) were added. Methylene diphenyl diisocyanate (13.38 parts) was added over 5 minutes and the reaction was stirred at 90° C. for 6 hours. Amino polyether (10.23 parts, Surfonamine® B200 ex Huntsman) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was an amber liquid with Mn=14500 and Mw=36700 as determined by GPC (tetrahydrofuran eluent, polystyrene standards).

Example 10

3-Amino-1,2-propane diol (1.46 parts by weight) and propylene glycol monomethyl ether acetate (20 parts) were stirred under nitrogen at 120° C. 1,8-Naphthalic anhydride (3.17 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate E), 1,4-cyclohexanedimethanol (0.16 parts) and propylene glycol monomethyl ether acetate (37.19 parts) were added. Tolylene-2,4-diisocyanate (14.48 parts) was added over 5 minutes and the reaction was stirred at 90° C. for 6 hours. Hydroxy polyester (13.35 parts, Intermediate F) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was an amber liquid with Mn=1300 and Mw=2000 as determined by GPC (tetrahydrofuran eluent, polystyrene standards).

Example 11

3-Amino-1,2-propane diol (0.6 parts by weight) and propylene glycol monomethyl ether acetate (20.2 parts) were stirred under nitrogen at 120° C. 1,8-Naphthalic anhydride (1.33 parts) was added over 10 minutes, followed by propylene glycol monomethyl ether acetate (20 parts), and the reaction mixture was stirred for 1 hour at 120° C. The reaction was then cooled to 90° C. and hydroxyamino polyether (44.45 parts, intermediate A), 1,4-benzene dimethanol (5.21 parts) and propylene glycol monomethyl ether acetate (43.09 parts) were added. Tolylene-2,4-diisocyanate (11.96 parts) was added over 5 minutes and the reaction was stirred at 90° C. for 6 hours. Hydroxy polyester (19.62 parts, Intermediate G) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was an amber liquid with Mn=3100 and Mw=7300 as determined by GPC (tetrahydrofuran eluent, polystyrene standards).

Example 12

3-Amino-1,2-propane diol (1.34 parts by weight) and propylene glycol monomethyl ether acetate (20 parts) were stirred under nitrogen at 120° C. 1,8-Naphthalic anhydride (2.91 parts) was added over 10 minutes, followed by propylene glycol monomethyl ether acetate (13.54 parts), and the reaction mixture was stirred for 1 hour at 120° C. The reaction was then cooled to 90° C. and dihydroxy polyester (97.5 parts, intermediate H) was added. Tolylene-2,4-diisocyanate (7.01 parts) was added over 5 minutes and the reaction was stirred at 90° C. for 6 hours. Hydroxy polyester (10.98 parts, intermediate C) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was an amber liquid with Mn=3000 and Mw=6500 as determined by GPC (tetrahydrofuran eluent, polystyrene standards).

Example 13

3-Amino-1,2-propane diol (1.34 parts by weight) and propylene glycol monomethyl ether acetate (20 parts) were stirred under nitrogen at 120° C. 1,8-Naphthalic anhydride (2.91 parts) was added over 10 minutes, followed by propylene glycol monomethyl ether acetate (19.04 parts), and the reaction mixture was stirred for 1 hour at 120° C. The reaction was then cooled to 90° C. and dihydroxyl polyester (97.5 parts, intermediate H) was added. Tolylene-2,4-diisocyanate (7.01 parts) was added over 5 minutes and the reaction was stirred at 90° C. for 6 hours. Amino polyether (14.65 parts, Surfonamine® B200 ex Huntsman) was added and the reaction stirred at 90° C. for 3 hours. 1,8-Diazabicyclo[5.4.0]undec-7-ene (0.12 parts) was added and the reaction was stirred at 90° C. for 1 hour until no isocyanate present as determined by IR. The reaction was then heated to 120° C. for 3 hours. The resulting product was an amber liquid with Mn=2800 and Mw=6500 as determined by GPC (tetrahydrofuran eluent, polystyrene standards).

Example 14

3-Amino-1,2-propane diol (4.86 parts by weight) and polyethylene glycol monomethyl ether (24.36 parts, molecular weight 750) were stirred under nitrogen at 120° C. 1,8-Naphthalic anhydride (10.28 parts) was added over 15 minutes, and the reaction mixture was stirred for 1 hour at 120° C. Dihydroxy polyether (62.50 parts, Ymer® N120 ex Perstorp) and 1,4-cyclohexanedimethanol (7.78 g) were added. Isophorone diisocyanate (39.72 g) was added over 10 minutes, and the reaction was stirred at 120° C. for 1 hour. The reaction was cooled to 90° C., and stirred for 18 hours. Dibutyltin dilaurate (0.1 parts) was added and the reaction stirred for 1 hour at 90° C. until no isocyanate present as determined by IR. The resulting product was a dark brown very viscous liquid with Mn=5800 and Mw=18400 as determined by GPC (tetrahydrofuran eluent, polystyrene standards).

Example 15

3-Amino-1,2-propane diol (3.78 parts by weight) and polyethylene glycol monomethyl ether (21.31 parts, molecular weight 750) were stirred under nitrogen at 130° C. 1,8-Naphthalic anhydride (7.98 parts) was added over 10 minutes, and the reaction mixture was stirred for 2 hours at 130° C. The reaction was then cooled to 50° C. Hydroxy amino polyether (33.72 parts, intermediate D) and 1,4-cyclohexanedimethanol (4.08 g) and 1,8-diazabicyclo[5.4.0] undec-7-ene (0.05 parts) were added. Isophorone diisocyanate (5.86 g) was added over 5 minutes, and the reaction was stirred at 50° C. for 30 minutes. The reaction was heated to 90° C., and isophorone diisocyanate (18.33 parts) was added. The reaction was stirred for 6 hours until no isocyanate present as determined by IR. The reaction was cooled to 25° C., distilled water (95.1 parts) was added and the reaction stirred for 2 hours. The resulting product was an amber liquid with Mn=2100 and Mw=3900 as determined by GPC (tetrahydrofuran eluent, polystyrene standards).

Example 16

3-Amino-1,2-propane diol (1.87 parts by weight) and polyethylene glycol monomethyl ether (21.31 parts, molecular weight 750) were stirred under nitrogen at 130° C. 1,8-Naphthalic anhydride (3.94 parts) was added over 10 minutes, and the reaction mixture is stirred for 2 hours at 130° C. The reaction was then cooled to 50° C. Hydroxyamino polyether (33.72 parts, Intermediate D) and 1,4-cyclohexanedimethanol (4.08 g) and 1,8-diazabicyclo [5.4.0]undec-7-ene (0.05 parts) were added. Isophorone diisocyanate (5.86 g) was added over 5 minutes, and the reaction was stirred at 50° C. for 30 minutes. The reaction was heated to 90° C., and isophorone diisocyanate (18.33 parts) was added. The reaction was stirred for 6 hours until no isocyanate present as determined by IR. The reaction was cooled to 25° C., distilled water (89.16 parts) was added and the reaction stirred for 2 hours. The resulting product was an amber liquid with Mn=2400 and Mw=5300 as determined by GPC (tetrahydrofuran eluent, polystyrene standards).

Dispersion Testing 1

A dispersion was prepared by dissolving Example 1, 2 or 3 (1.9 parts based on 100% active) and acrylic resin (1.05 parts, Macrynal® SMC565 ex Cytec) in propylene glycol monomethyl ethyl acetate (23.3 parts). Glass beads (3 mm in diameter, 125 parts) and blue pigment (8.75 parts, Heliogen® Blue L6700F ex BASF) were added and the contents milled on a Skandex shaker for 4 hours.

The resulting fluid millbase (35 parts) was letdown into a solution of acrylic resin (36.45 parts, Macrynal SMC565 ex Cytec), polyisocyanate (3.24 parts, Desmodur N3390 ex Bayer) and propylene glycol monomethyl ether acetate (41.98 parts) then drawndown onto black and white card with a number 3 Kbar Increased gloss and reduced haze properties were achieved in the presence of examples 1, 2 and 3 vs CE1 as measured using a Byk-Gardner gloss meter.

TABLE 1

| Dispersant | 20° gloss | 60° gloss | Haze |
|---|---|---|---|
| CE1 | 64.9 | 84 | 132 |
| Example 1 | 74.3 | 83.9 | 19.4 |
| Example 2 | 76.4 | 85.8 | 26.2 |
| Example 3 | 70.4 | 81.9 | 23.4 |

Dispersion Testing 2

A dispersion was prepared by dissolving Example 2 (1.79 parts based on 100% active) and acrylic resin (1.05 parts, Macrynal® SMC565 ex Cytec) in propylene glycol monomethyl ethyl acetate (26.22 parts). Glass beads (3 mm, 125 parts) and red pigment (5.95 parts, Irgazin® Red D3656 ex Ciba) were added and the contents milled on a Skandex shaker for 4 hours.

The resulting fluid millbase (35 parts) was letdown into a solution of acrylic resin (24.45 parts, Macrynal SMC565 ex Cytec), polyisocyanate (2.20 parts, Desmodur N3390 ex Bayer) and propylene glycol monomethyl ether acetate (17.68 parts) then drawndown onto black and white card with a number 3 Kbar Increased gloss properties were achieved in the presence of EX2 vs CE1 as measured using a Byk-Gardner gloss meter.

TABLE 2

| Dispersant | 20° gloss | 60° gloss | Haze |
|---|---|---|---|
| CE1 | 74.8 | 88.9 | 95.0 |
| Example 2 | 86.0 | 102.0 | 109 |

Dispersion Testing 3

Dispersions were prepared by dissolving each of the dispersants 4-9 (1.0 g dispersant, based on 50% active solution) in butyl acetate. Glass beads (3 mm diameter, 17 parts) and red pigment (Cromopthal® Red A2B ex BASF, 2.0 parts) were added and the contents milled on a horizontal shaker for 16 hrs. The resulting mill bases exhibited excellent fluidity

TABLE 3

| Example | Fluidity |
|---|---|
| 4 | Very fluid |
| 5 | Very fluid |
| 6 | Very fluid |
| 7 | Very fluid |
| 8 | Fluid |
| 9 | Very fluid |

Dispersion Testing 4

Dispersions were prepared by dissolving each of the dispersants 10-13 (1.0 g dispersant, based on 50% active solution) in toluene. Glass beads (3 mm diameter, 17 parts) and red pigment (Cromopthal® Red A2B ex BASF, 2.0 parts) were added and the contents milled on a horizontal shaker for 16 hrs. The resulting mill bases exhibited excellent fluidity

TABLE 4

| Example | Fluidity |
|---|---|
| 10 | fluid |
| 11 | Very fluid |

TABLE 4-continued

| Example | Fluidity |
|---|---|
| 12 | Very fluid |
| 13 | Very fluid |

Dispersion Testing 5

A dispersion was prepared by dissolving Example 14, 15 or 16 (0.9 parts as 100% active dispersant) in distilled water (7.6 parts). 3 mm glass beads (17 parts) and red pigment (1.5 parts, Ink jet magenta E5B 02 ex Clariant) are added and the contents milled on a horizontal shaker for 16 hours. The resulting dispersions were fluid and 0.1 parts were added to a glass vial containing diethylene glycol dibutyl ether/ distilled water mixtures (10 parts). The dispersions were visually inspected after 1, 2, 24 and 72 hrs for evidence of sedimentation which indicates flocculation Solution A is 15 parts diethylene glycol dibutyl ether/85 parts water Solution B is 20 parts diethylene glycol dibutyl ether/80 parts water Solution C is 25 parts diethylene glycol dibutyl ether/75 parts water

TABLE 5

| Example | Solution A Time for flocculation to occur/ hrs | Solution B Time for flocculation to occur/ hrs | Solution C Time for flocculation to occur/ hrs |
|---|---|---|---|
| CE2 | 72 | 1 | 1 |
| EX14 | Did not flocculate | Did not flocculate | Did not flocculate |
| EX15 | Did not flocculate | 72 | 2 |
| EX16 | Did not flocculate | 72 | 72 |

Each of the documents referred to above is incorporated herein by reference, including any prior applications, whether or not specifically listed above, from which priority is claimed. It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, non-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional unrecited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A polymer comprising a polymer chain having at least two urethane linkages and at least two pendant imide side chain groups, wherein each imide group is chemically bonded to an aromatic ring the polymer is represented by Formula (1):

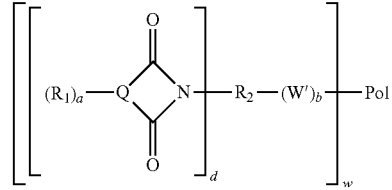

Formula (1)

wherein each variable is independently each time it occurs as follow:

$R_1$ is a non-hydrogen substituent on Q ring and $R_1$ is independently an electron withdrawing group selected from the group of —$NO_2$, —$SO_2NR'_2$, —$C(O)R'$, —$SO_3M$, halogen, —$NH_2$, or —$OR'$, or an electron releasing alkyl group of 1 to 3 carbon atoms, the number of non-H substituted groups on Q is from 0 to 2; wherein M is H, a metal cation, $NR'_4{}^+$, or mixtures thereof; each R' is independently —H or an optionally-substituted alkyl containing 1 to 20 carbon atoms, and the substituent of R' is hydroxyl or halogen or mixtures thereof;

Q is a fused or non-fused aromatic ring containing $4n+2$ $\pi$-electrons, wherein n=1 or more, and n is the number of aromatic rings, and Q is bonded to the imide group in such a way to form a 5 or 6 membered imide ring;

b is independently 1 or 2;

and when b is 1 the imide group is terminal and attached to the Pol by one chemical bond and when b is 2 the imide group is a side chain attached to Pol by two chemical bonds;

d is 1, 2, or 3; wherein the 1 to 3 imide groups are optionally attached to $R_2$ at different carbon atoms of $R_2$, $R_2$ is a $C_1$ to $C_{20}$ hydrocarbylene group or a $C_1$ to $C_{20}$ hydrocarbonylene group or mixtures thereof; $R_2$ optionally includes oxygen and/or nitrogen atoms wherein there is at least 2 carbon atoms per every oxygen or nitrogen of $R_2$;

W' is a nitrogen atom, an oxygen atom or a direct bond;

w is one or more;

Pol is a polyurethane comprising at least two urethane and/or urea linkages and at least one solvent-solubilizing chain selected from the group of polyether, polyolefin, polyester and polyacrylate; wherein said at least one of polyether, polyester, polyolefin and polyacrylate terminal chains have a number average molecular weight of 500-2000 g/mole; and wherein said at least one solvent-solubilizing chain is selected from pendant, terminal, and/or lateral side chains, or mixtures of said terminal and/or side chains and wherein the polyurethane is essentially linear and is derived from a polyisocyanate with an average isocyanate functionality between 1.9 and 2.1.

2. The polymer of claim 1 wherein said polymer comprises an essentially linear polyurethane backbone from reacting polyisocyanates with an average functionality between 1.9 and 2.1 with both a) solvent-solubilising chains of polyether, polyolefin, polyester, and/or polyacrylic having two reactive groups, said reactive groups being reactive with isocyanates to form chemical bonds, at one end of said solvent-solubilising chain and said reactive groups being within 2 to 17 atoms of each other along the solvent-solubilising chain and b) at least one imide compound having groups reactive with isocyanates, wherein the imide compound has an average functionality of 1.5 to 2.1 when reacted with isocyanates, wherein the polyurethane backbone has attached thereto 2 or more pendant imide side chains of the structure

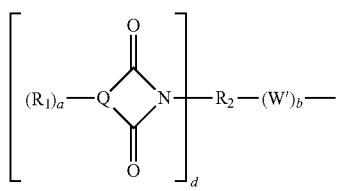

Formula (2)

and c) said polyisocyanates are reacted with urethane formative compounds having groups reactive with isocyanates wherein the urethane formative compounds have an average functionality of 1.0 to 2.1
wherein W', $R_1$, Q, a, b, d, and $R_2$ are as previously defined.

3. The polymer of claim 2, wherein the polymer contains up to 30 imide groups of Formula (2)

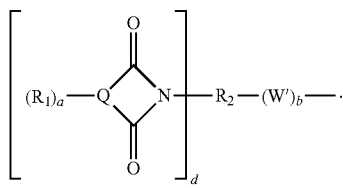

4. The polymer according to claim 3, wherein said additional urethane formative compounds are reacted with up to 10 mol % of reactive isocyanate groups of said polyisocyanate.

5. The polymer of claim 1, wherein said Q group is a single benzene ring or a naphthalene ring.

6. The polymer according to claim 1, wherein Q is naphthalene.

7. The polymer according to claim 1, wherein on average at least one $R_1$ per polymer is a —$SO_3H$, —Cl, —Br, —$NO_2$ group.

8. The polymer of claim 1, wherein said at least one of polyether, polyester, polyolefin and polyacrylate has at least two functional groups that are reactive with isocyanate groups to form a chemical bond at one end of the molecule but do not have a second distally located chemical group that is reactive with isocyanate groups to form a chemical bond and therefore creates a polyether, polyester, polyolefin or polyacrylate that is only attached to the polymer at one point and any additional ends of said polyether, polyester, polyolefin or polyacrylate function as a chain end.

9. The polymer of claim 1 which is obtained by a process comprising:

a) sourcing a polyisocyanate molecule having isocyanate groups and an isocyanate functionality between 1.9 and 2.1 groups, b) reacting at least one of said isocyanate groups of said polyisocyanate molecule with at least one solvent-solubilising chain selected from polyether, polyester, polyolefin and polyacrylate having about two groups at one end of said solvent-solubilising chain to form a terminal or pendant side chain, c) reacting at least one of said reactive isocyanate groups of said polyisocyanate with an imide group containing molecule of the Formulas 7-11

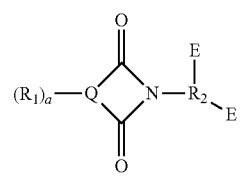

Formula 7

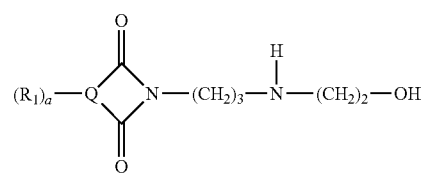

Formula 8

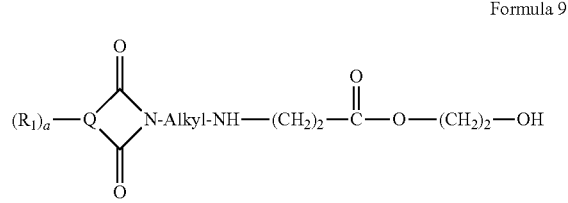

Formula 9

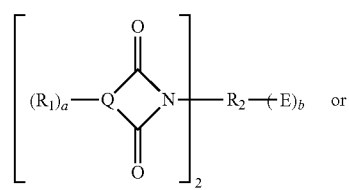

Formula 10

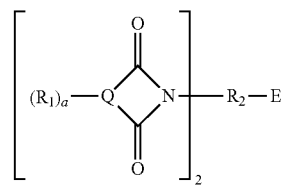

Formula 11

$R_1$ and $R_2$ are previously defined in as a hydrocarbylene group or hydrocarbonylene group, Q is as previously defined, E is defined as —OH, —$NH_2$, —N(H)—, or —$CO_2H$.

10. The polymer of claim 1, wherein said polyether, polyester, polyolefin or polyacrylate used in said Pol comprise from about 20 to about 80 wt. % of said polymer.

11. The polymer of claim 1, wherein said polymer has at least three pendant imide groups having the formula

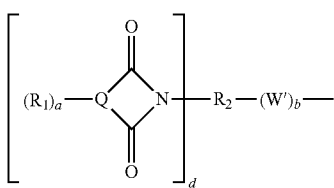

attached to polyurethane backbone in at least four separate locations.

12. A composition comprising a a) particulate solid, b) an aqueous medium, and c) a polymer represented by claim 1.

13. The composition of any claim 12, wherein the composition is a millbase, paint or ink.

14. A polymer according to claim 1, wherein the polymer comprises:
an essentially linear polyurethane backbone from reacting polyisocyanates with an average functionality between 1.9 and 2.1 with at least two imide compounds have groups reactive with isocyanates, wherein the imide compound has an average functionality of 1.5 to 2.1 when reacted with isocyanates, wherein the polyurethane backbone has attached thereto at least two pendant imide side chains and at least one terminally attached solvent-solubilising chains of polyether, polyolefin, polyester, and/or polyacrylic;
wherein at least 50 mole % of said solvent-solubilising chains of polyether, polyolefin, polyester, and/or polyacrylic have only one functional group reactive with isocyanate groups to form a chemical bond, at one end of said at least one solvent-solubilising chain and not having an isocyanate reactive group at the other terminus of said chain; and
said polyisocyanates are reacted with urethane formative compounds having groups reactive with isocyanates wherein the urethane formative compounds have an average functionality of 1.0 to 2.1.

15. The polymer of claim 14, wherein the polymer contains up to 30 imide groups of Formula

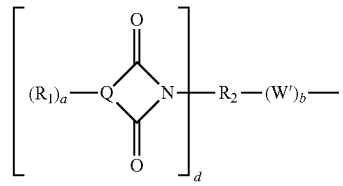

wherein $R_1$, Q, $R_2$, W', d, b, and a are as previously defined.

16. The polymer according to claim 15, wherein said additional urethane formative compound is reacted with up to 10 mol % of reactive isocyanate groups of said polyisocyanate.

17. The polymer of claim 15, wherein said Q group is a single benzene ring or a naphthalene ring.

18. The polymer according to claim 15; wherein Q is naphthalene.

19. The polymer according to claim 15, wherein on average at least one $R_1$ per polymer is a —$SO_3H$, —Cl, —Br, —$NO_2$ group.

20. The polymer of claim 15, wherein at least 50 mole % of said solvent-solubilising chains selected from least one of polyether, polyester, polyolefin and polyacrylate has one functional group that is reactive with isocyanate groups to form a chemical bond at one end of the molecule but do not have a second distally located chemical group that is reactive with isocyanate groups to form a chemical bond and therefore creates a polyether, polyester, polyolefin or polyacrylate that is only attached to the polymer at one point and any additional ends of said polyether, polyester, polyolefin or polyacrylate function as a chain end.

* * * * *